(12) United States Patent
Otsuka

(10) Patent No.: US 12,014,443 B2
(45) Date of Patent: Jun. 18, 2024

(54) GRAPHICS PROCESSOR AND INFORMATION PROCESSING SYSTEM

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 56 days.

(21) Appl. No.: 17/796,346

(22) PCT Filed: Jan. 14, 2021

(86) PCT No.: PCT/JP2021/001092
§ 371 (c)(1),
(2) Date: Jul. 29, 2022

(87) PCT Pub. No.: WO2021/157315
PCT Pub. Date: Aug. 12, 2021

(65) Prior Publication Data
US 2023/0066833 A1 Mar. 2, 2023

(30) Foreign Application Priority Data
Feb. 5, 2020 (JP) .................. 2020-018370

(51) Int. Cl.
*G06T 1/20* (2006.01)
*G06F 13/40* (2006.01)
*G06T 1/60* (2006.01)

(52) U.S. Cl.
CPC ............ *G06T 1/20* (2013.01); *G06F 13/4027* (2013.01); *G06T 1/60* (2013.01)

(58) Field of Classification Search
CPC .................. G06T 1/20; G06T 1/60
See application file for complete search history.

(56) References Cited

U.S. PATENT DOCUMENTS

| | | | |
|---|---|---|---|
| 9,552,206 B2 | 1/2017 | Johnson | |
| 2012/0131309 A1 | 5/2012 | Johnson | |

(Continued)

FOREIGN PATENT DOCUMENTS

| | | | |
|---|---|---|---|
| JP | 10171766 A | 6/1998 | |
| JP | 2014500549 A | 1/2014 | |
| JP | 2019521453 A | 7/2019 | |

OTHER PUBLICATIONS

Decision to Grant a Patent for corresponding JP Application No. 2021-575687, 5 pages, dated Aug. 2, 2023.

(Continued)

*Primary Examiner* — Charles Tseng
(74) *Attorney, Agent, or Firm* — Matthew B. Dernier, Esq.

(57) ABSTRACT

A graphics processor having a command processor and a geometry engine and connected to a memory and another graphics processor includes a bus fabric that delivers and receives data to and from the memory connected thereto, and a first interconnect that is connected to the command processor and the geometry engine and that delivers and receives data to and from a command processor and a geometry engine of the other graphics processor. Via a second interconnect, the bus fabric delivers and receives data to and from a bus fabric of the other graphics processor, and is accessibly connected to a memory connected to the other graphics processor.

8 Claims, 21 Drawing Sheets

(56) References Cited

U.S. PATENT DOCUMENTS

| | | |
|---|---|---|
| 2018/0024938 A1 | 1/2018 | Paltashev |
| 2018/0293695 A1* | 10/2018 | Sharma ................ G06T 15/005 |
| 2018/0293786 A1 | 10/2018 | Einsko |
| 2020/0027015 A1 | 1/2020 | Yao |
| 2020/0167888 A1* | 5/2020 | Katayama ................ G06T 1/20 |

OTHER PUBLICATIONS

International Search Report for corresponding PCT Application No. PCT/JP2021/001092, 4 pages, dated Apr. 13, 2021.
Extended European Search Report for corresponding EP Application No. 21750518.9, 10 pages, dated Feb. 1, 2024.
Sun Yifan Yifansun, et al., "MGPUSim enabling multi-GPU performance modeling and optimization," Proceedings of the 2020 CHI Conference on Human Factors in Computing Systems, pp. 197-209, Jun. 22, 2019.

* cited by examiner

FIG. 5
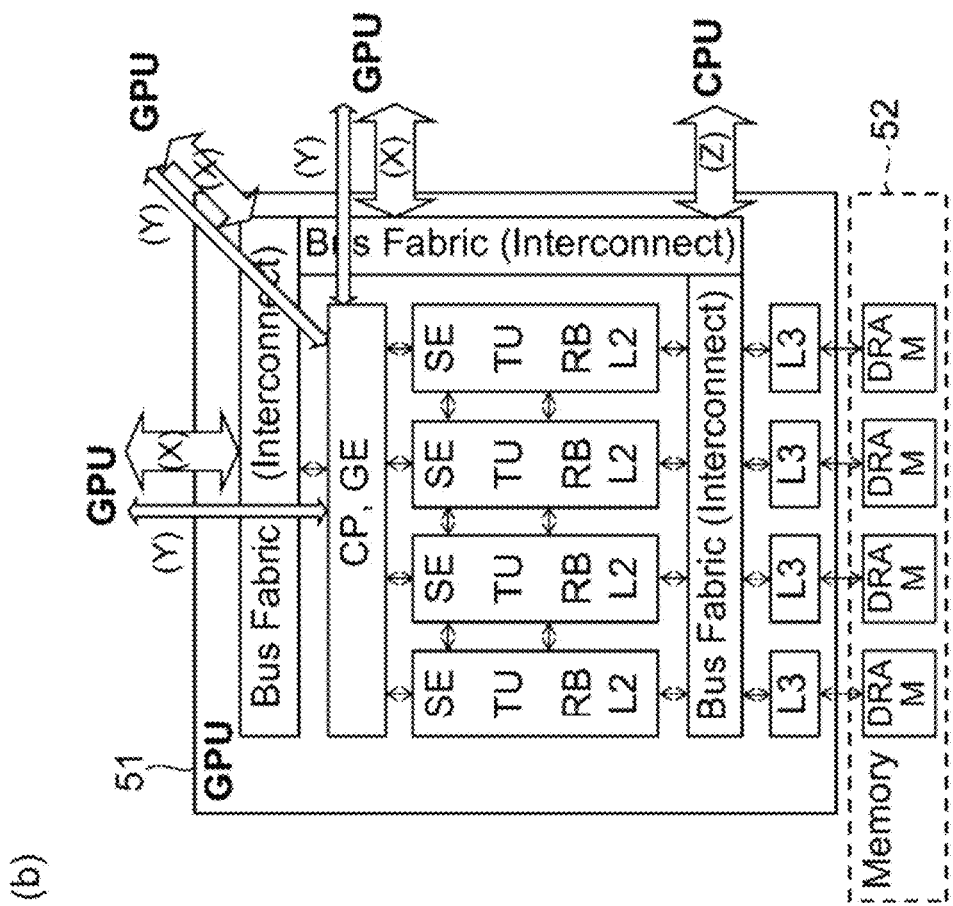
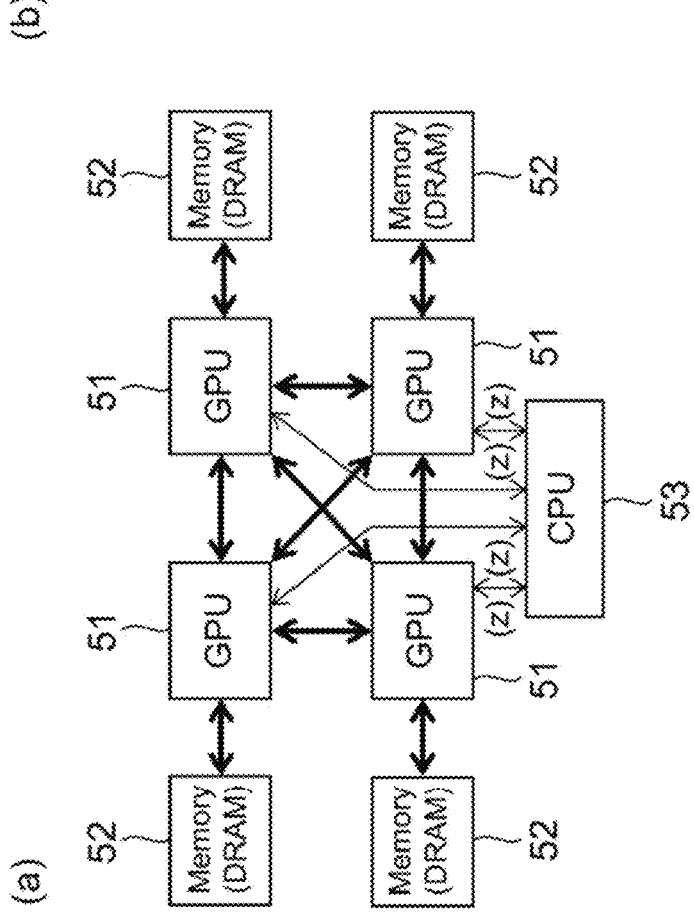

F I G . 1 0
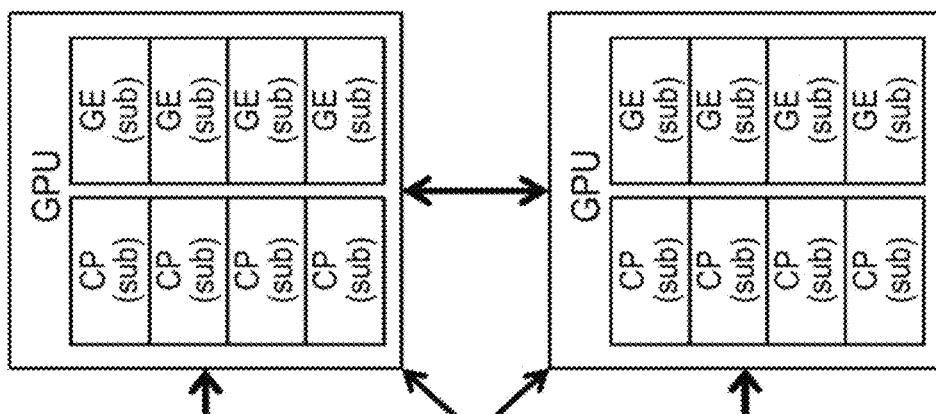
(b)
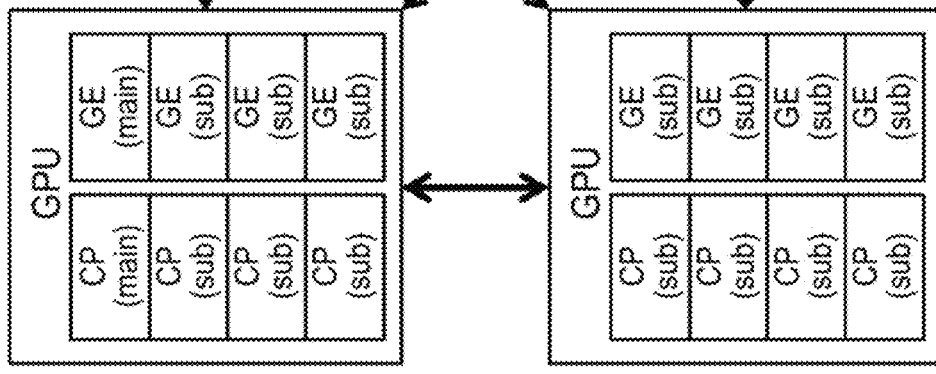
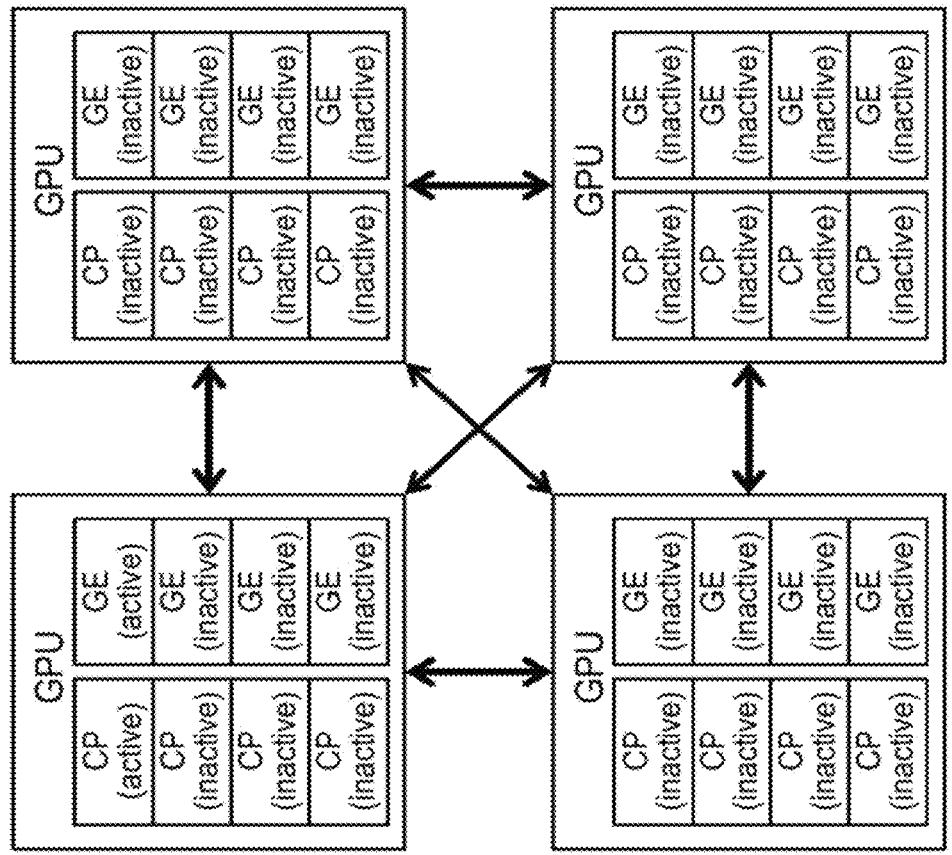
(a)

F I G. 1 4
(a) 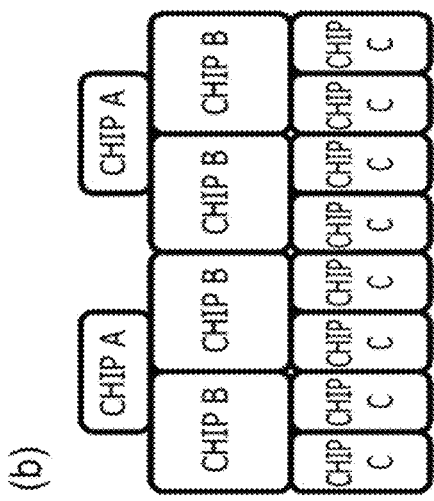
(b) 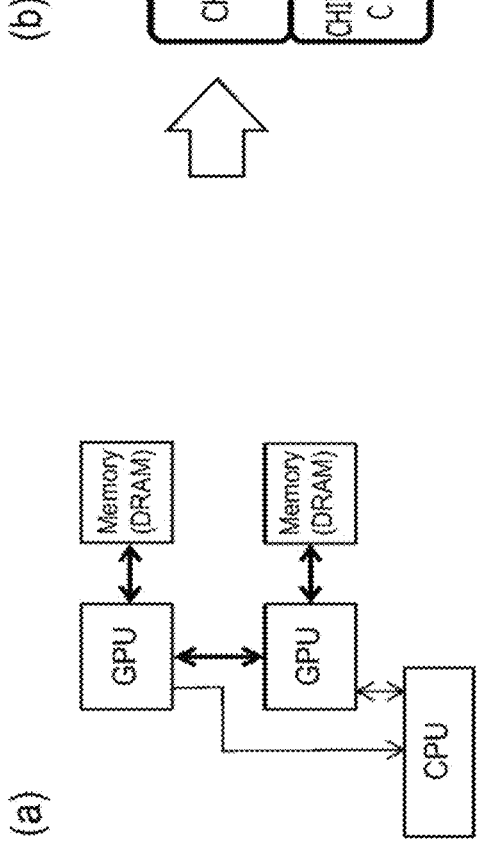
(c) 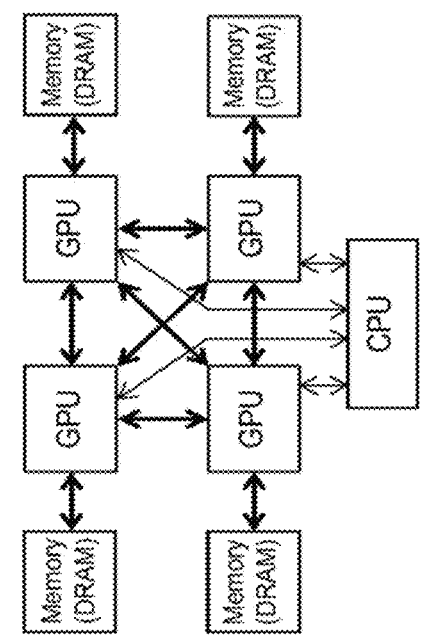
(d) 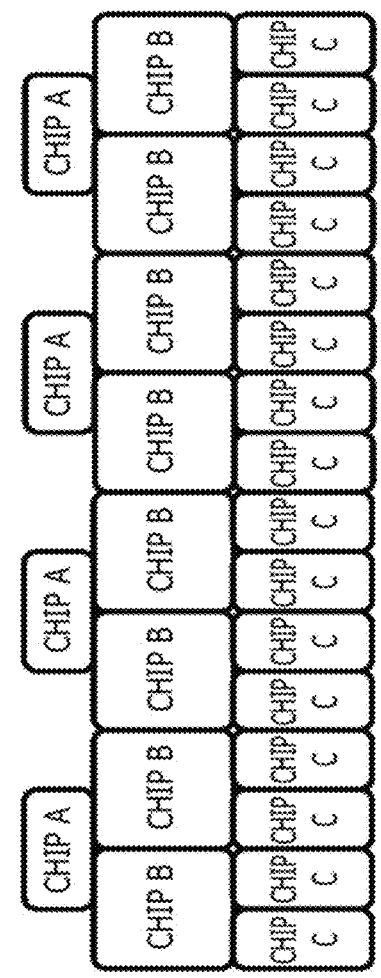

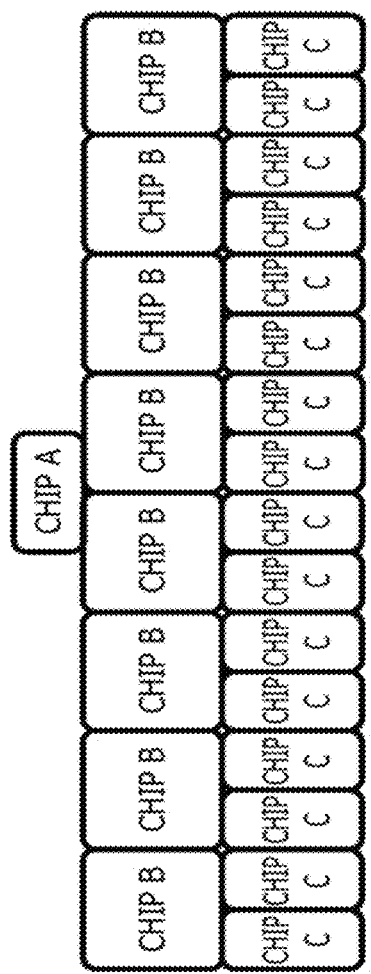
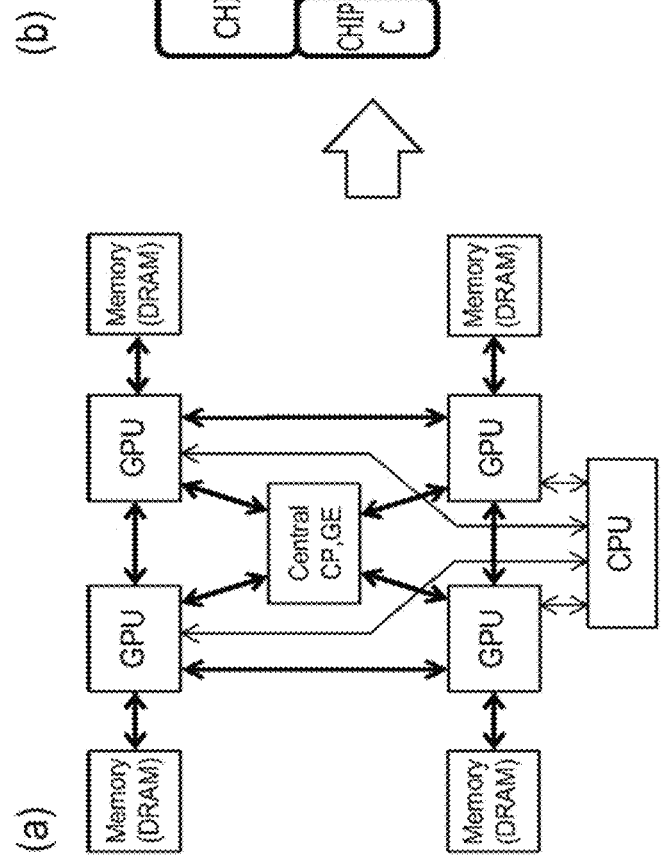
FIG. 15

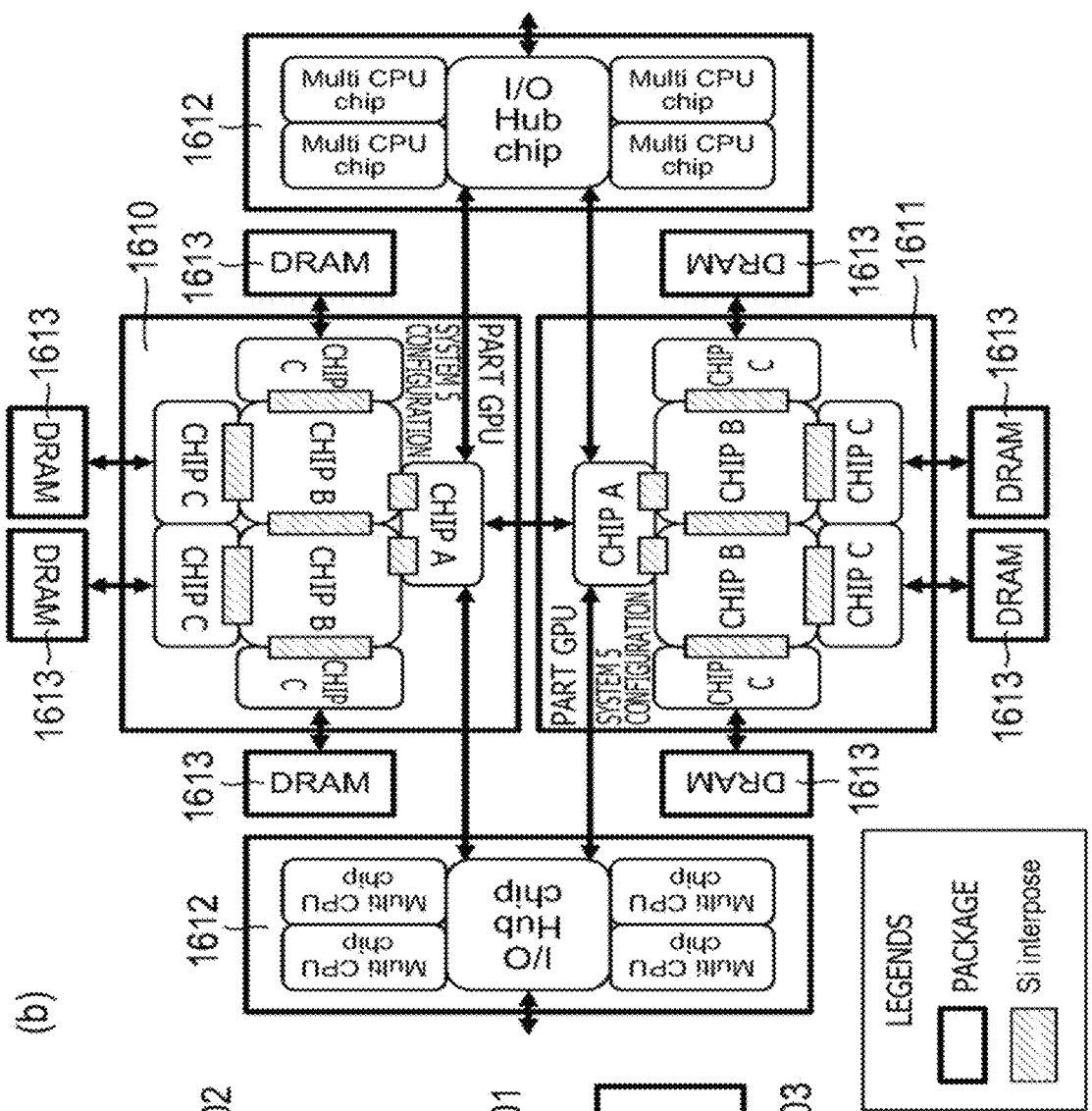
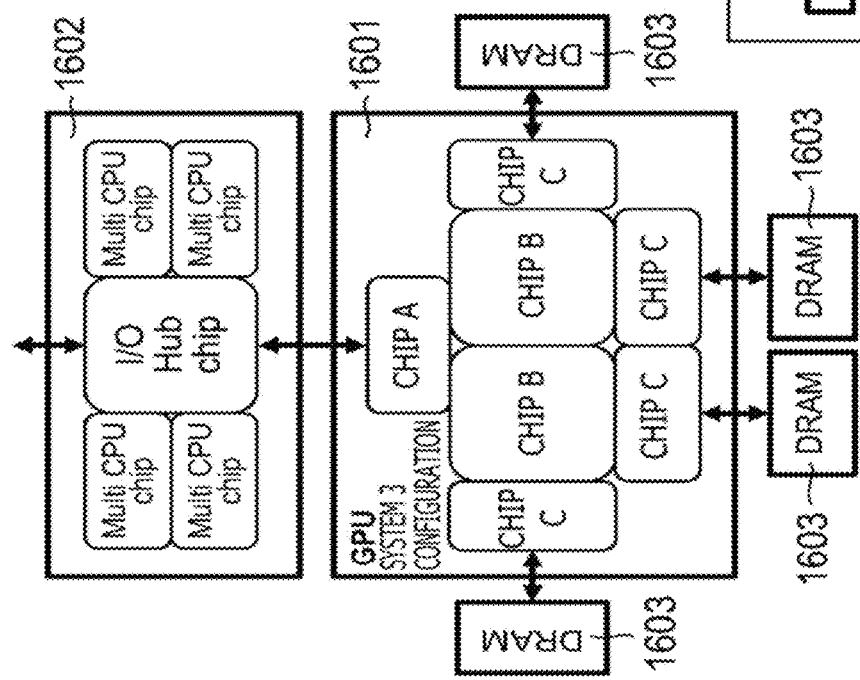
FIG. 16

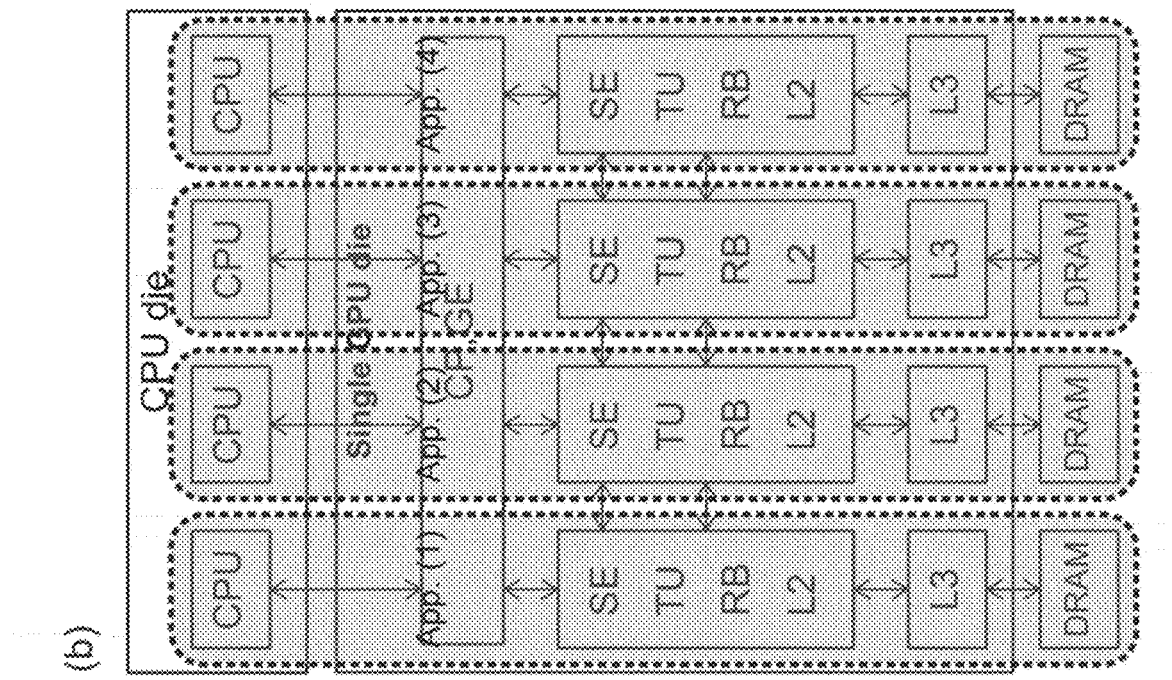
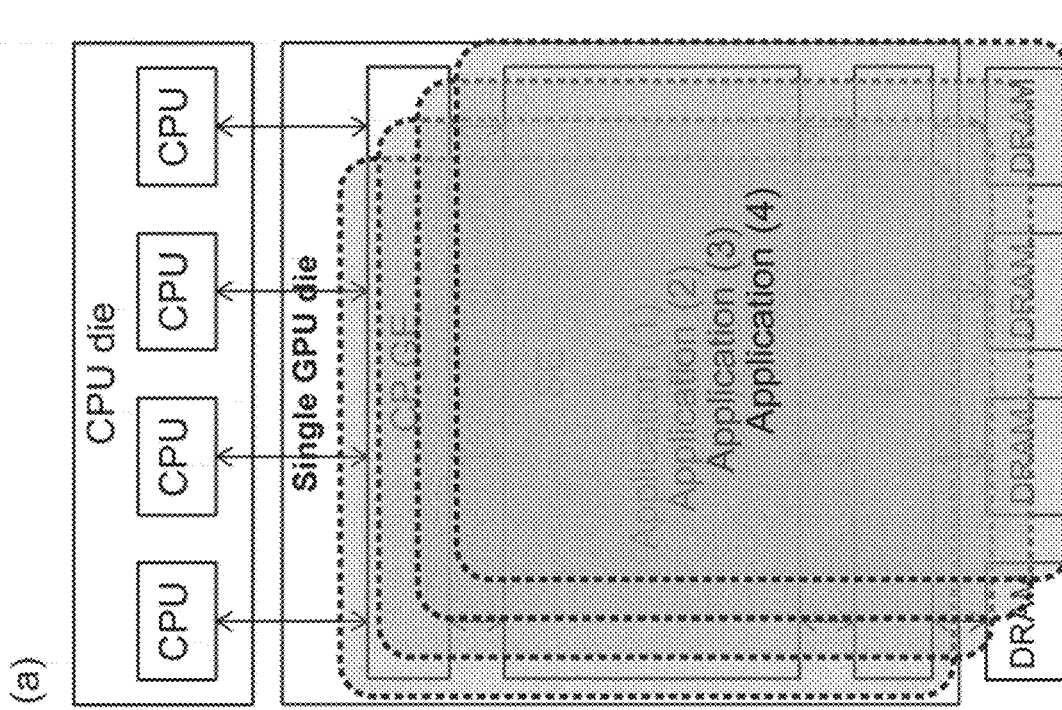
FIG. 17

FIG. 18
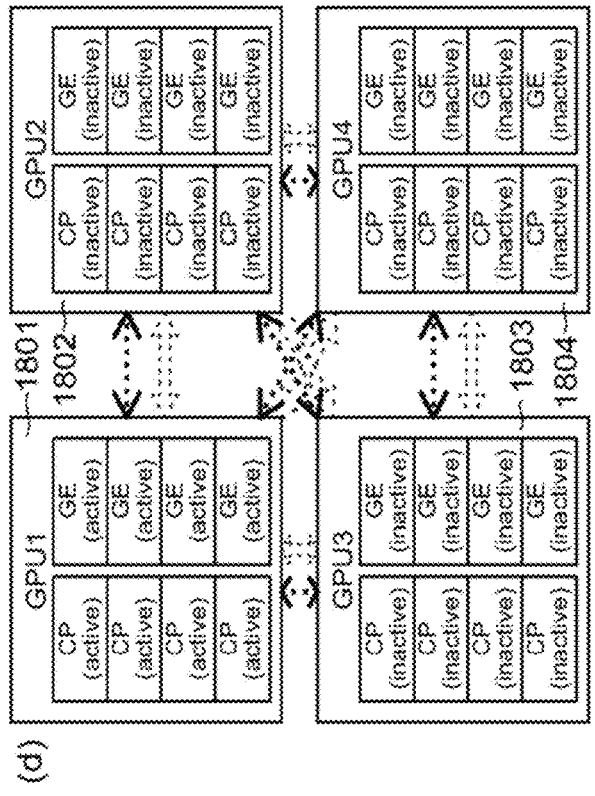
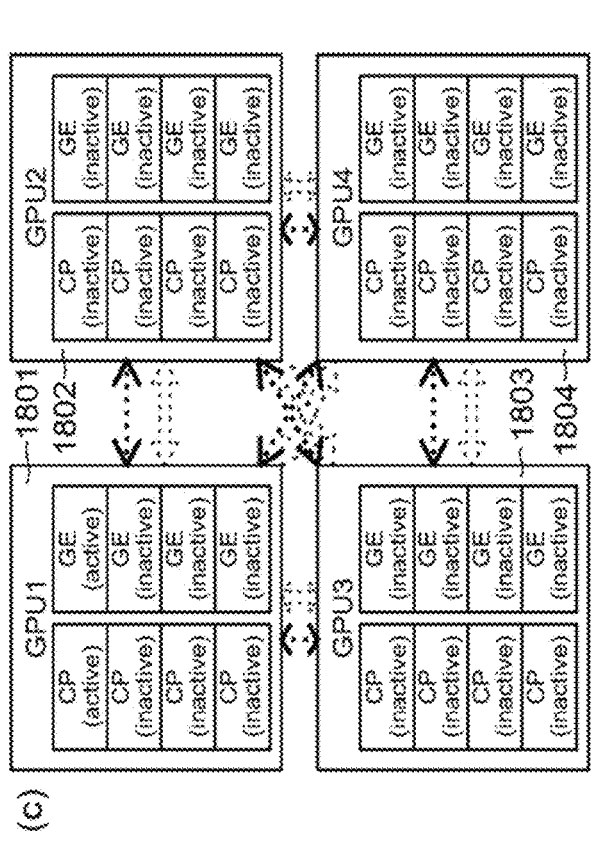

FIG. 21
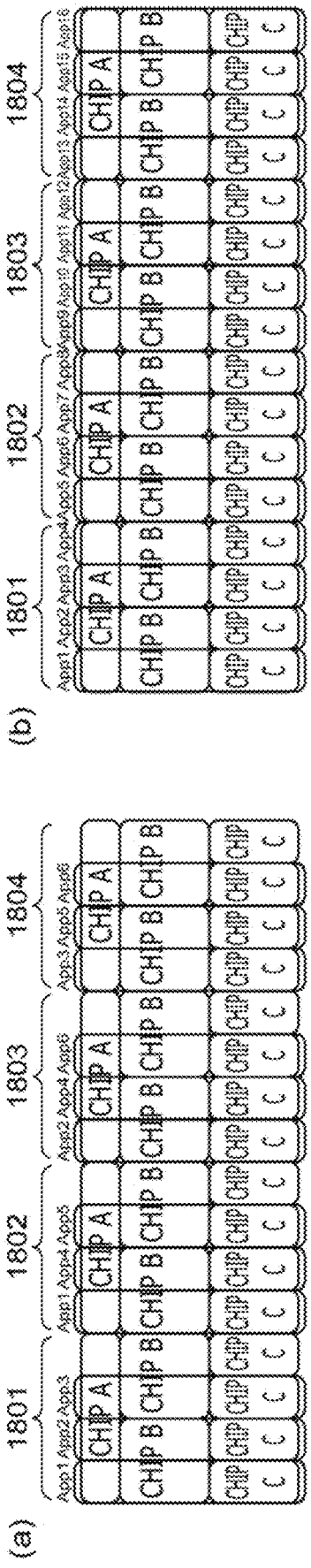
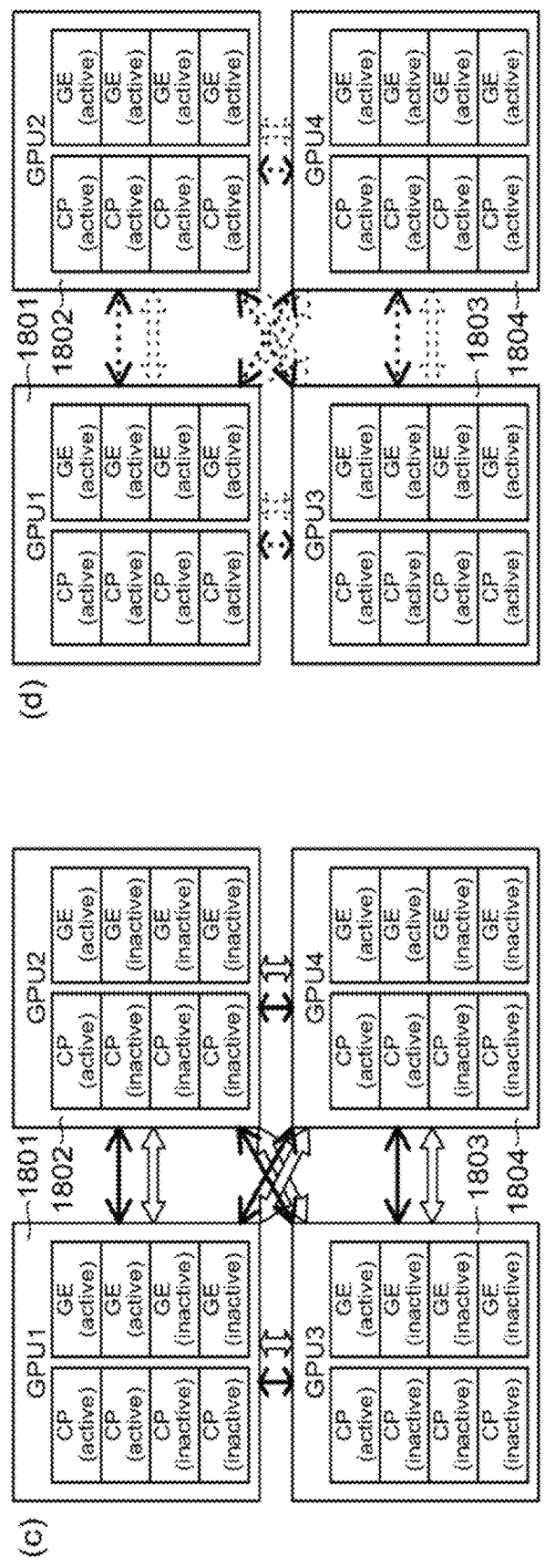

GRAPHICS PROCESSOR AND INFORMATION PROCESSING SYSTEM

TECHNICAL FIELD

The present invention relates to a graphics processor and an information processing system.

BACKGROUND ART

In a case where an image processing system using a graphic processing unit (GPU) chip (graphics processor) needs an improvement in performance, the image processing system is commonly used with the GPU chip replaced with a GPU chip of higher performance.

In this example, the one GPU chip performs image processing (in particular, a 3D graphics rendering process) while using a large-capacity memory directly connected to the GPU chip on the basis of instructions from software that operates on a central processing unit (CPU) (FIG. 4(b)). However, the scale that can be implemented by one chip is limited due to factors such as manufacturable scale and power density.

Thus, in a case where there is a desire for a further improvement in performance, it is conceivable to use a plurality of GPU chips at the same time in one system (FIG. 4(c)), but this approach causes several technical problems.

First, when 3D graphics are rendered in real time according to processing of CPU software, it is necessary in processing on GPUs that one frame be rendered and outputted to a frame buffer on a memory while information regarding all objects included in one scene that is dynamically determined is grasped. This series of processes involves many dependence/reference relationships, and therefore, it is not easy to divide the processes among the plurality of GPU chips and memories connected individually thereto and separated from one another. In general, resolution of the dependence/reference relationships among the plurality of GPU chips and the separated memories is difficult, which makes it difficult to improve processing performance. To develop software that is capable of appropriately distributing 3D graphics rendering processes is also difficult.

Incidentally, in a case where the GPU chips are used to perform general-purpose computing, unlike the case with rendering of 3D graphics, distributed processing among the plurality of GPU chips can sometimes be implemented. This is because such processes do not require a high degree of real-time capability and can sometimes be performed by employing a technique similar to a technique employed in distributed processing among a plurality of CPUs. However, also in this case, only a limited rate of performance improvement can thus be achieved.

Note that a configuration in which one large-capacity memory is shared by a CPU and a GPU chip (what is called a UMA: Unified Memory Architecture; FIG. 4(a)) is superior to a configuration in which a CPU and a GPU chip have individual memories separated from each other in terms of processing efficiency, performance, and the degree of difficulty in software development. However, the scale that can be implemented with this form is also limited due to factors such as manufacturable scale and power density.

SUMMARY

Technical Problem

As described above, in a case of an image processing system using known GPU chips, combining an improvement in performance with conditions in terms of manufacturable scale and power density is difficult.

The present invention has been conceived in view of the above circumstances, and an object thereof is to provide a graphics processor and an information processing system which are able to achieve an improvement in performance while conditions in terms of manufacturable scale and power density are satisfied.

Solution to Problem

A mode of the present invention, which solves the problems of the related art described above, is directed to a graphics processor having a command processor and a geometry engine and connected to a memory and another graphics processor, the graphics processor including a bus fabric that delivers and receives data to and from the memory connected thereto, and a first interconnect that is connected to the command processor and the geometry engine and that delivers and receives data to and from a command processor and a geometry engine of another graphics processor. Via a second interconnect, the bus fabric delivers and receives data to and from a bus fabric of the other graphics processor and is accessibly connected to a memory connected to the other graphics processor.

Advantageous Effect of Invention

According to the present invention, there are provided a graphics processor and an information processing system which are able to achieve an improvement in performance while conditions in terms of manufacturable scale and power density are satisfied.

BRIEF DESCRIPTION OF DRAWINGS

FIG. 5 represents configuration block diagrams illustrating examples of GPUs according to the embodiment of the present invention.

FIG. 10 represents yet other explanatory diagrams each illustrating an example of distributed processing of a plurality of GPUs according to the embodiment of the present invention.

FIG. 14 represents explanatory diagrams (4) each illustrating an example mode in which one virtual GPU or scalable GPU is constructed using GPUs according to the embodiment of the present invention.

FIG. 15 represents explanatory diagrams (5) each illustrating an example mode in which one virtual GPU or scalable GPU is constructed using GPUs according to the embodiment of the present invention.

FIG. 16 represents explanatory diagrams (6) each illustrating an example mode in which one virtual GPU or scalable GPU is constructed using GPUs according to the embodiment of the present invention.

FIG. 17 represents explanatory diagrams (1) each illustrating an example in which a plurality of applications are executed through time division and/or space division using a GPU according to the embodiment of the present invention.

FIG. 18 represents explanatory diagrams (2) each illustrating an example in which a plurality of applications are executed through time division and/or space division using GPUs according to the embodiment of the present invention.

FIG. 21 represents explanatory diagrams (5) each illustrating an example in which a plurality of applications are executed through time division and/or space division using GPUs according to the embodiment of the present invention.

DESCRIPTION OF EMBODIMENT

Figure 1:
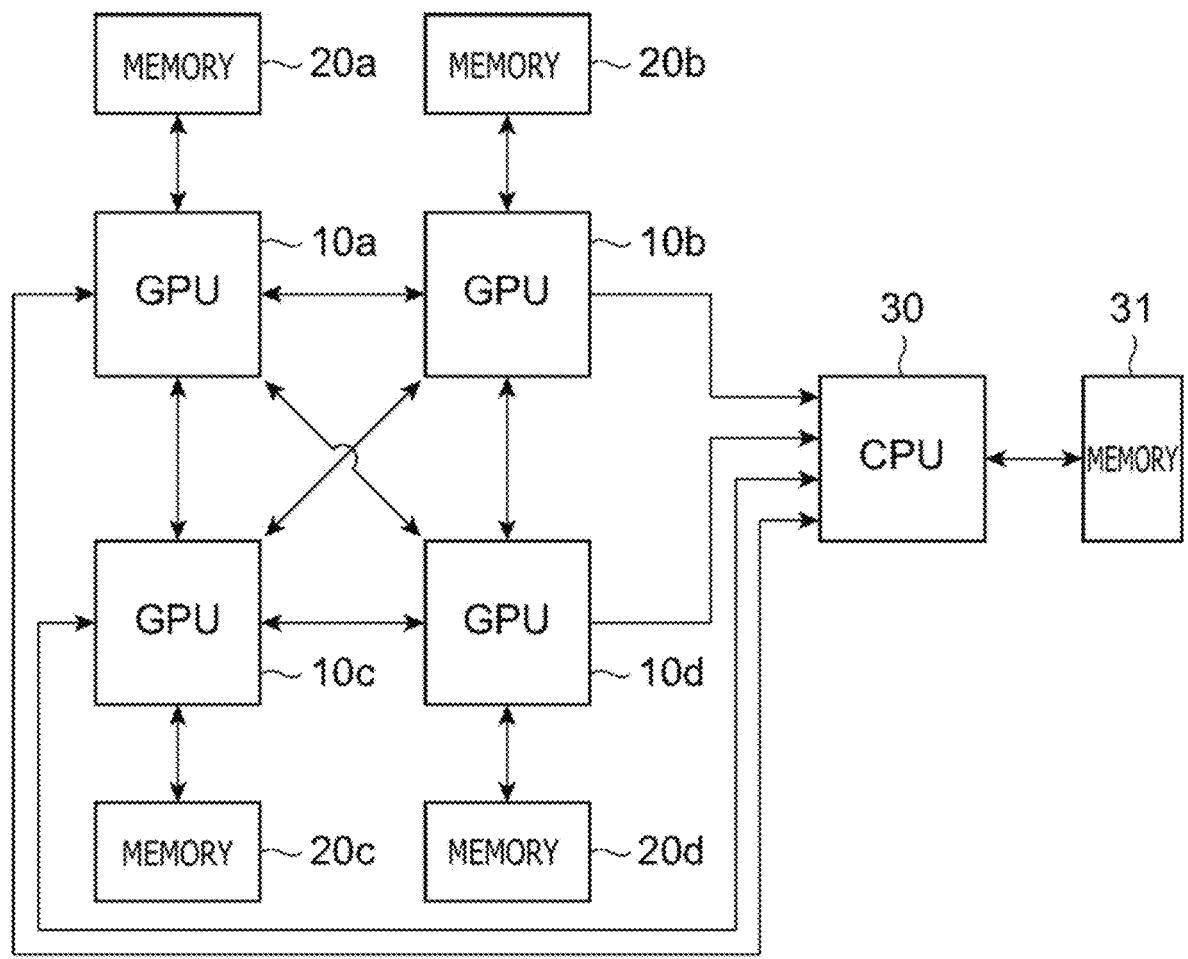
FIG. 1 is a block diagram illustrating an example configuration of an information processing system according to an embodiment of the present invention.

An embodiment of the present invention will be described with reference to the accompanying drawings. As illustrated in FIG. 1, an information processing system 1 according to the embodiment of the present invention includes a plurality of graphics processors (GPUs) 10a, 10b, . . . , and memories 20a, 20b, . . . provided for the respective GPUs 10, and each of the GPUs 10 is connected to a CPU 30. In addition, a memory 31 is connected to the CPU 30. An example of the information processing system 1 according to the present embodiment performs control such that the plurality of GPUs 10 as a whole operate as a single virtual GPU.

Note that the GPUs 10a, 10b, . . . will be referred to generally as GPUs 10 unless the GPUs need to be distinguished from one another. Similarly, the memories 20a, 20b, . . . will be referred to generally as memories 20 unless the memories need to be distinguished from one another.

In addition, while an example case in which four GPUs 10 are used is illustrated in FIG. 1, the number of GPUs and how the GPUs are connected to one another are not limited to the example illustrated in FIG. 1. In connection with this point, other examples will be described below.

Figure 2:
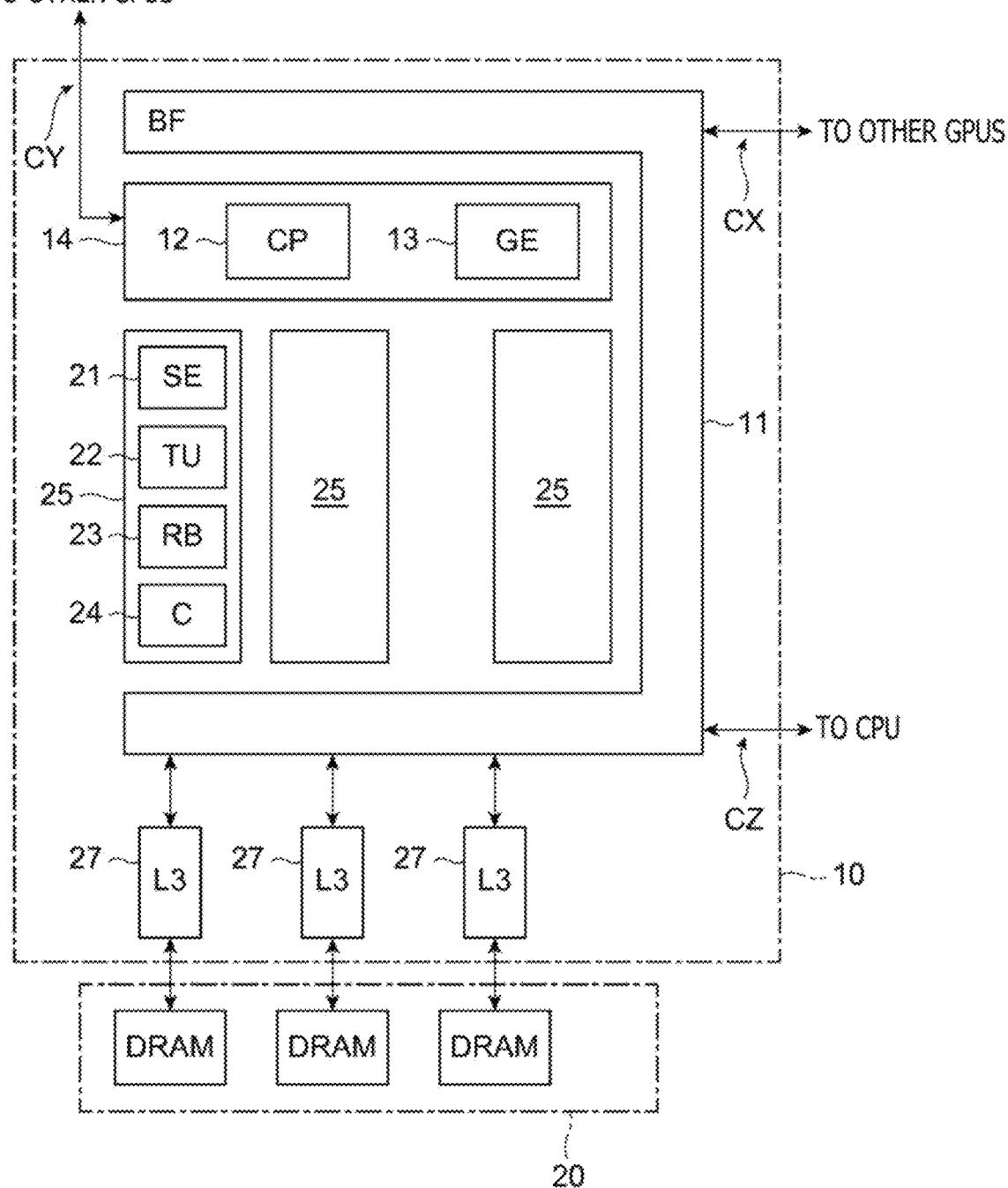
FIG. 2 is a block diagram illustrating an example configuration of a graphics processor according to the embodiment of the present invention.

As illustrated in FIG. 2, each GPU 10 includes a bus fabric 11, a control unit 14 including a command processor (CP) 12 and a geometry engine (GE) 13, a plurality of rendering processing units 25 each including a shader engine (SE) 21, a texture unit (TU) 22, a rendering backend (RB) 23, and a cache 24, and L3 caches 27.

Figure 3:
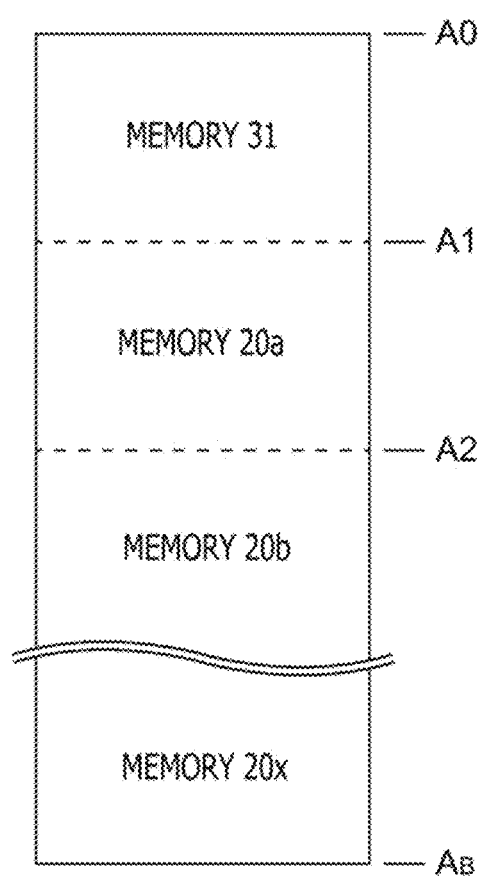
FIG. 3 is an explanatory diagram illustrating an example of a memory space formed by a plurality of graphics processors included in the information processing system according to the embodiment of the present invention.

In the example of the present embodiment, the memories 20a, 20b, . . . connected to the respective GPUs 10 and the memory 31 connected to the CPU 30 together form a single memory space. That is, as an outline thereof is illustrated in FIG. 3, address areas that do not overlap with one another in the single memory space are allocated to the memories 20a, 20b, . . . and the memory 31. In the example of FIG. 3, an address area from an address A0 to an address A1 is allocated to the memory 31, an address area from an address A1+1 to an address A2 is allocated to the memory 20a, and so on, so that the address areas allocated to the memories 20 and 31 are continuous address areas, which together form a single address area.

When operating, the plurality of GPUs 10 and the CPU 30 thus share a common global address space, and are each grasping the address areas in the address space to which resources of the CPU/GPU itself are allocated. Specifically, the bus fabric 11 according to the present embodiment holds information as to the address area allocated to the memory 20 connected to the GPU 10 that contains the bus fabric 11 itself. Note that address areas individually allocated to the respective GPUs 10 may be continuous address areas. Also, note that this allocation may be done by either a static or a dynamic method. Additionally, note that memory management may be performed by employing a paging method using an MMU (Memory Management Unit) or the like.

<Configuration/Operation of Bus Fabric>

Via a predetermined inter-GPU interconnect (corresponding to a second interconnect of the present invention) CX, the bus fabric 11 delivers and receives data to and from the bus fabric 11 of another GPU 10, and is accessibly connected to the memory 20 connected to the other GPU 10. In addition, the bus fabric 11 shares the memory 31 connected to the CPU 30 and the memory 20 connected to the bus fabric 11 itself as a single memory via a predetermined inter-chip interconnect CZ. This inter-chip interconnect CZ and processing operations performed therethrough are similar to those of a known configuration using a UMA, and therefore, detailed descriptions thereof are omitted here.

In addition, the bus fabric 11 receives, from various components in the GPU 10 to which the bus fabric 11 itself belongs, a memory access request specifying an address. The bus fabric 11 determines whether or not the address specified in the memory access request is an address in the address area allocated to the memory 20 connected to the GPU 10 to which the bus fabric 11 itself belongs.

Here, if the address specified in the memory access request is an address in the address area allocated to the memory 20 connected to the GPU 10 to which the bus fabric 11 itself belongs, the bus fabric 11 makes access (i.e., a process of reading data or writing data) to the memory 20 connected to the GPU 10 to which the bus fabric 11 itself belongs according to the memory access request.

Meanwhile, if the address specified in the memory access request is not an address in the address area allocated to the memory 20 connected to the GPU 10 to which the bus fabric 11 itself belongs, the bus fabric 11 identifies another GPU 10 or the CPU 30 to which an address area including the specified address is allocated.

If the address specified in the memory access request is an address in the address area allocated to the memory 20 connected to any other GPU 10, the bus fabric 11 performs data transfer in relation to the bus fabric 11 of the other GPU 10 via the abovementioned inter-GPU interconnect CX, and makes access (i.e., a process of reading data or writing data) to the memory 20 connected to the other GPU 10.

Meanwhile, if the address specified in the memory access request is an address in the address area allocated to the memory 31 connected to the CPU 30, the bus fabric 11 makes access (i.e., a process of reading data or writing data) to the memory 31 connected to the CPU 30 via the abovementioned inter-chip interconnect CZ.

Note that, in a case where there are a plurality of routes through which data can be transmitted or received to or from the other GPU 10 or the CPU 30 connected to the memory 20 or 31 to be accessed in accordance with topology of connection of the plurality of GPUs 10 and the CPU 30, the bus fabric 11 selects the shortest route for the data transfer on the basis of the connection relationships. A method for such route selection is widely known, and therefore, a description thereof is omitted here.

Further, the bus fabric 11 may perform data transfer (what is called snooping) based on a predetermined cache coherence protocol via the inter-GPU interconnect CX. The caches used in the GPU 10 according to the present embodiment will be described below.

<Configuration of Control Unit>

The control unit 14 is connected to the control units 14 of the other GPUs 10 such that data can be transferred therebetween via an inter-chip interconnect CY (corresponding to a first interconnect of the present invention). The inter-chip interconnect CY allows coordinate data of shaders before and after tessellation, information as to connection between primitives in 3D objects, and the operation statuses (i.e., information indicating "running," "stopped," "waiting for synchronization," "waiting for data," "abnormal state," or the like) of the GEs 13 to be transferred between the control units 14 of the plurality of GPUs 10 (in particular, between the GEs 13, which will be described below), and allows handshake signals for synchronizing processes of the control units 14 thereof to be transferred therebetween.

The control unit 14 includes at least one CP 12 and at least one GE 13. The CP 12 acquires (fetches) and decodes a command stream generated by the CPU 30, and identifies a process to be performed on the basis of a result of the decoding. The CP 12 causes the SE 21 included in the rendering processing unit 25 or the like to perform the identified process through dispatching.

In an example of the present embodiment, the CP 12 includes a microcontroller that fetches, decodes, and executes command streams, and a direct memory access (DMA) that performs resource management, such as dispatching of processes. The CP 12 may further include a scheduler that makes adjustments of times at which processes are performed.

In the present embodiment, the CP 12 manages the timings of processes in the rendering processing units 25 etc. in the GPU 10 to which the CP 12 itself belongs (i.e., execution flows in general, such as the order of priority, processes such as termination and synchronization, and management of threads) while referring to the contents of not only processes to be performed by the CP 12 itself but also processes to be performed by the CPs 12 of the other GPUs 10.

Specifically, the CP 12 delivers and receives, to and from the CPs 12 of other GPUs 10, information (i.e., a process dispatch instruction content) indicating the content of a process dispatched, instructions as to the order of priority, information indicating the operation statuses ("running," "stopped," "waiting for synchronization," "waiting for data," "abnormal state," or the like) of blocks, such as the SEs 21, in the chip, and handshake signals for synchronizing processes. For this control of execution timings, a method similar to a method that can be adopted for control of processing timings between processors in common distributed processing can be adopted.

The GE 13 performs processes as a surface shader, such as tessellation, which converts a surface of a three-dimensional virtual object (i.e., a 3D object) which the GE 13 is instructed by the CPU 30 to render to more detailed primitives.

In addition, the GE 13 performs processes of, for example, a geometry shader which receives input of primitives such as polygons made up of a plurality of vertices and removes and adds vertices, a vertex shader which performs coordinate transformation of vertices, and a primitive shader which integrates these.

Here, processes that follow the processes as the surface shader can be performed in parallel, with computation blocks such as the SEs 21, which will be described below, allocated to respective rendering target regions obtained by dividing a screen on which results of rendering appear into parts (e.g., upper left, upper right, lower left, and lower right quarters). In a case where a result of rendering a 3D object extends over multiple rendering target regions, for example, processes need to be performed collectively with respect to the 3D object prior to division thereof to the above rendering target regions. This is because, otherwise, maintaining coherence of each divided part would be difficult and an improvement in processing efficiency cannot be achieved.

Accordingly, in the present embodiment, the GE 13 performs processes while delivering and receiving coordinate data before and after the process such as tessellation to and from the GEs 13 of the other GPUs 10.

<Distributed Processing by Control Units>

Specifically, in a case where the plurality of GPUs 10 are controlled to together function as a single virtual GPU, the control unit 14 of each GPU 10 operates according to one of the following methods. It is assumed that, in each of the following examples of operation, routes are selected such that transfers via the inter-chip interconnect CY will be as small in number as possible and will be completed as quickly as possible.

(First method) According to this method, the control unit 14 of one of the plurality of GPUs 10 functions as a representative of the control units 14 of all the GPUs 10.

Then, the CP 12a of the representative control unit 14 (which is assumed to be the control unit 14a of the GPU 10a for the sake of convenience) fetches and decodes a command stream outputted by the CPU 30, and identifies a process to be performed on the basis of a result of the decoding. Then, the CP 12a determines the SE 21 or the like that is to perform the identified process from among the SEs 21 or the like of the rendering processing units 25 included in the GPUs 10. In a case where the CP 12a has determined that the process is to be performed in any of the rendering processing units 25 of the GPU 10a itself, for example, the CP 12a outputs an instruction to perform the identified process and data necessary for the process to the rendering processing unit 25 of the GPU 10a itself via an intra-chip interconnect, thereby causing the rendering processing unit 25 to perform the process.

Meanwhile, in a case where the CP 12a has determined that the process is to be performed in any of the rendering processing units 25 of the GPUs 10 other than the GPU 10a, e.g., one of the rendering processing units 25 of the GPU 10b, the CP 12a sends the instruction to perform the identified process and the data necessary for the process to the CP 12b of the GPU 10b via the inter-chip interconnect CY.

Each of the CPs 12 (in the above-described example, the CPs 12 other than the CP 12a of the GPU 10a) of the GPUs 10 that are not the representative exclusively functions as an interface between the rendering processing units 25 and the representative CP 12a (i.e., is in an inactive state), and, for example, outputs instructions to perform processes and data necessary for the processes received from the representative CP 12a to the rendering processing units 25 of the GPU 10 to which the CP 12 itself belongs, thereby causing the rendering processing units 25 to perform the processes.

That is, in this example, the CP 12b of the GPU 10b outputs instructions to perform processes and data necessary for the processes received from the representative CP 12a to the rendering processing units 25 of the GPU 10b, to which the CP 12b itself belongs, thereby causing the rendering processing units 25 to perform the processes.

According to this example, the CP 12a of the representative GPU 10a performs overall control and responsibly performs control management (i.e., operates in an active state), thereby managing processes in shaders and so on of all the GPUs 10. Thus, optimization of overall allocation of processes and synchronization processes are made possible, enabling processes using a large number of shaders and so on that cannot be accomplished on one chip, and enabling an improvement in processing efficiency.

In addition, in this first method, the GE 13a of the representative GPU 10a (which operates in an active state) performs processes as the surface shader, such as tessellations of surfaces of all 3D objects that are to be rendered.

Then, on the basis of the allocation of processes made by the CP 12a, the GE 13a sends information (including a result of the tessellation etc.) as to each of the 3D objects to the GE 13 of the GPU 10 that contains the corresponding rendering processing unit 25 (in a case where the process is to be performed in any of the rendering processing units 25 of the GPU 10 to which the GE 13a itself belongs, the GE 13a outputs the information to the rendering processing unit 25 in the GPU 10a, to which the GE 13a itself belongs, via an intra-chip interconnect).

Regarding the GEs 13 as well, each of the GEs 13 (in the above-described example, the GEs 13 other than the GE 13a of the GPU 10a) of the GPUs 10 that are not the representative exclusively functions as an interface between the rendering processing units 25 and the representative GE 13a (i.e., is in an inactive state), and, for example, outputs instructions to perform processes and data necessary for the processes received from the representative GE 13a to the rendering processing units 25 of the GPU 10 to which the GE 13 itself belongs, thereby causing the rendering processing units 25 to perform the processes.

That is, the GE 13b of the GPU 10b, for example, outputs information as to a 3D object received from the representative GE 13a via the inter-chip interconnect CY to the corresponding rendering processing unit 25 of the GPU 10b, to which the GE 13b itself belongs, thereby causing the rendering processing unit 25 to perform the process.

(Second method) In addition, the control unit 14 in one of the GPUs 10 may perform overall control and cause each of the GPUs 10 to implement distributed processing, instead of the control unit 14 in one of the GPUs 10 responsibly controlling processes to be performed in all the GPUs 10.

In this second method, the control units 14 of all the GPUs 10 operate in an active state, but a particular one of the GPUs 10 (which is assumed to be the GPU 10a, for example) operates as a master, and the control unit 14a of the master GPU 10a implements distributed processing with the control units 14b, 14c, . . . of the other GPUs 10b, 10c, . . . as subordinates.

Specifically, the CP 12a of the control unit 14a of the master GPU 10a fetches a command stream outputted by the CPU 30, and causes the CPs 12b, 12c, . . . of the other GPUs 10b, 10c, . . . , which are subordinates, to perform decoding and identify processes to be performed on the basis of results of the decoding.

Each of the CPs 12b, 12c, . . . , which function as subordinates, determines the SE 21 or the like that is to perform the identified process from among the SEs 21 or the like of the rendering processing units 25 included in the GPUs 10. In a case where the CP 12b has determined that the process is to be performed in any of the rendering processing units 25 of the GPU 10b, to which the CP 12b itself belongs, for example, the CP 12b outputs an instruction to perform the identified process and data necessary for the process to the rendering processing unit 25 of the GPU 10b itself via an intra-chip interconnect, thereby causing the rendering processing unit 25 to perform the process.

Meanwhile, in a case where the CP 12b has determined that the process is to be performed in any of the rendering processing units 25 of the GPUs 10a, 10c, . . . other than the GPU 10b, e.g., one of the rendering processing units 25 of the GPU 10a, the CP 12b sends the instruction to perform the identified process and the data necessary for the process to the CP 12a of the GPU 10a via the inter-chip interconnect CY.

In this example of the second method, each CP 12 functions also as an interface between the rendering processing units 25 and the representative CP 12a, and, for example, outputs an instruction to perform a process and data necessary for the process received from the CP 12 of another GPU 10 to the corresponding rendering processing unit 25 of the GPU 10 to which the CP 12 itself belongs, thereby causing the rendering processing unit 25 to perform the process.

That is, in this example, the CP 12a of the GPU 10a outputs the instruction to perform the process and the data necessary for the process received from the CP 12b to the corresponding rendering processing unit 25 of the GPU 10a, to which the CP 12a itself belongs, thereby causing the rendering processing unit 25 to perform the process.

In addition, in this second method, the GE 13a of the master GPU 10a causes the GEs 13b, 13c, . . . of the other GPUs 10b, 10c, . . . to perform processes as surface shaders, such as tessellations of surfaces of all the 3D objects that are to be rendered, through distribution. A widely known method can be adopted for control of this distributed processing, and therefore, a detailed description thereof is omitted here.

Then, on the basis of the allocation of processes made by the CP 12, each of the GEs 13b, 13c, . . . of the GPUs 10b, 10c, . . . , which are subordinates, sends information (including a result of the tessellation etc.) as to each of the 3D objects to the GE 13 of the GPU 10 that contains the corresponding rendering processing unit 25 (in a case where the process is to be performed in any of the rendering processing units 25 of the GPU 10 to which the GE 13 itself belongs, the GE 13 outputs the information to the rendering processing unit 25 in the GPU 10 to which the GE 13 itself belongs via an intra-chip interconnect).

Even this GE 13 functions also as an interface between the rendering processing units 25 and the representative GE 13a, and, for example, outputs an instruction to perform a process and data necessary for the process received from the GE 13 of any other GPU 10 to the corresponding rendering processing unit 25 of the GPU 10 to which the GE 13 itself belongs, thereby causing the rendering processing unit 25 to perform the process.

In this second method, the CPs 12 and the GEs 13 of the plurality of GPUs 10 are used in combination through distributed processing, and together function as if they were a single CP 12 and a single GE 13. Note that it is not necessary that the CPs 12 and the GEs 13 of all the GPUs 10 be always active and perform computations and that the CP 12 and the GE 13 of the master CPU 10 may determine the numbers of CPs 12 and GEs 13 of GPUs 10 which are caused to operate as subordinates according to processing capacity necessary for processes to be performed, and control only the determined numbers of CPs 12 and GEs 13 of GPUs 10 to perform the processes in a distributed manner.

(Third method) Further, each GPU 10 may include a plurality of control units 14. In this case, it may be sufficient if one control unit 14 in one GPU 10 functions as a representative or a master to implement distributed processing by employing the first or second method. Alternatively, in this example, each of the control units 14 in the GPU 10 may perform processes based on a separate application program.

<Configuration/Operation of Rendering Processing Unit>

The SE 21 performs arithmetic processing as various shaders, such as a vertex shader and a pixel shader, using data inputted from the control unit 14. The SE 21 generally contains a unit (Compute Unit: CU) that performs a plurality of processes in parallel through time/space division. In addition, the SE 21 may perform a rasterization process of converting polygons to pixel values.

Further, when reading data stored in any of the memories 20 and 31 or writing data to any of the memories 20 and 31 during processing, the SE 21 outputs, to the bus fabric 11, a request to access the memory together with information specifying an address from or to which the data is to be read or written (in a case where the data is to be written thereto, together with the data to be written as well). Then, the SE 21 receives, from the bus fabric 11, the data read from the memory 20 or 31.

The TU 22 requests the bus fabric 11 to acquire texture data and various numerical value tables from the memory 20 or 31. Then, the TU 22 receives the data which the bus fabric 11 has acquired from the memory 20 or 31 in response to the request, and, after subjecting the data to a filtering process if necessary, outputs the resulting data to the SE 21, which operates as a pixel shader.

The RB 23 receives pixel values that are pixel shader outputs outputted by the SE 21, performs an alpha test, a stencil test, a depth test, etc., determines whether or not a pixel is to be rendered with respect to each of pixels, and, if it is determined that the pixel is to be rendered, writes the pixel to a frame buffer (which is assumed to be secured at predetermined addresses in the memory 20 or 31). At the time of this writing, the RB 23 requests the bus fabric 11 to write data related to the rendering of the pixel to an address corresponding to the pixel to be written in an address area set as the frame buffer in the memory 20 or 31.

Note that, when making a request to access the memory 20 or 31, each of the SE 21, the TU 22, and the RB 23 may output the access request directly to the bus fabric 11, but it is assumed here that each of the SE 21, the TU 22, and the RB 23 outputs the access request via the cache 24. In addition, it is assumed that each of the SE 21, the TU 22, and the RB 23 receives data read from any of the memories 20 and 31 via the cache 24 (or from the cache 24).

Similarly to a common GPU, the GPU 10 according to the present embodiment may contain a plurality of rendering processing units 25, such as the SEs 21 (CUs), the TUs 22, and the RBs 23, having equivalent functions arranged in parallel. In this case, the CP 12 and the GE 13 cause the plurality of rendering processing units to perform rendering processes in parallel on the basis of a predetermined distributed processing control method.

The cache 24 includes a plurality of cache lines (i.e., storage regions in which a cache tag and data are stored so as to be associated with each other). In addition, the cache 24 includes an address comparator, a way switch, and so on. Each cache line has a tag and a data line, and the tag includes a cache target address, a replace-rule-control bit, parity/error correcting code (ECC) bits, control information such as a line lock bit, and so on. In addition, the tag may include information indicating which of the GPUs 10 is connected to the memory 20 from which the data stored has been read. The data line may include, for example, parity/ECC bits in addition to the cached data.

In an example of the present embodiment, the cache 24 intervenes between the bus fabric 11 and each of the SE 21, the TU 22, and the RB 23, intercepts an access request outputted from each of the SE 21, the TU 22, and the RB 23 to the bus fabric 11, and determines whether or not data at an address to be accessed is stored in any of the cache lines. In a case where the request is a read request, if the data at the address to be accessed is stored in any of the cache lines, the cache 24 reads the data therefrom and outputs the data to the requester, i.e., any one of the SE 21, the TU 22, and the RB 23. Meanwhile, in a case where the request is a write request, if the data at the address to be accessed is stored in any of the cache lines, the cache 24 overwrites the data with data of the request.

Meanwhile, if the data at the address to be accessed is not stored in any of the cache lines, the cache 24 outputs the intercepted access request to the bus fabric 11. Then, the cache 24 receives the data read from the memory 20 or 31 via the bus fabric 11, outputs this data to the access requester, i.e., any one of the SE 21, the TU 22, and the RB 23, and stores the received data in any one of the cache lines so as to be associated with the address related to the access request. This operation is similar to an operation of a common cache memory.

Further, in the present embodiment, the cache 24 performs data transfer (what is called snooping) based on a predetermined cache coherence protocol in relation to another GPU 10 or the CPU 30 via the bus fabric 11 and the inter-GPU interconnect CX. Coherence of the cached data is thus maintained. Note that the cache 24 may be contained in any of the SE 21, the TU 22, and the RB 23.

Furthermore, the cache 24 (i.e., an L0, L1, or L2 cache) according to the present embodiment intervenes between the bus fabric 11 and each of the SE 21, the TU 22, and the RB 23, and may record, with respect to each of the cache lines, a flag that indicates whether the data stored in the cache line has been read from the memory 20 connected to the GPU 10 to which the cache 24 itself belongs or whether the data has been read from the memory 20 connected to any other GPU 10 so as to be associated with the cache line.

This flag may be a 1-bit flag that indicates only whether the data has been read from the memory 20 connected to the GPU 10 to which the cache 24 itself belongs or whether the data has been read from the memory 20 connected to any other GPU 10. Alternatively, the flag may be a multi-bit flag (i.e., a flag that identifies the GPU 10) that identifies the GPU 10 connected to the memory 20 from which the data stored has been read, i.e., the GPU 10 to which the cache 24 itself belongs or a particular one of the other GPUs 10.

In a case where this configuration is adopted, control may be performed in a replacement process of replacing the data stored in the cache line such that a result of caching read from the memory 20 connected to a particular one of the GPUs 10 will be preferentially left. In addition, in the replacement process of replacing the data stored in the cache line, control may be performed such that a result of caching from the memory 20 connected to a particular one of the GPUs 10 will be preferentially left on the basis of a collected result of an execution profile of an application that uses the stored data.

Further, the cache 24, which intervenes between the bus fabric 11 and each of the SE 21, the TU 22, and the RB 23, may record, with respect to each of the cache lines thereof, a configuration flag for setting as to whether data read from the memory 20 connected to the GPU 10 to which the cache 24 itself belongs is to be stored therein or whether data read from the memory 20 connected to any other GPU 10 is to be stored therein so as to be associated therewith.

This configuration flag may also be a 1-bit flag that indicates only whether data read from the memory 20 connected to the GPU 10 to which the cache 24 itself belongs is to be stored or whether data read from the memory 20 connected to any other GPU 10 is to be stored. Alternatively, the configuration flag may be a multi-bit flag (i.e., a flag that identifies the GPU 10) that identifies the GPU 10 connected to the memory 20 from which data to be stored is to be read, i.e., the GPU 10 to which the cache 24 itself belongs or a particular one of the other GPUs 10.

In this example, each of the blocks such as the SE 21, the TU 22, the RB 23, and the bus fabric 11, which perform caching, refers to the configuration flag with respect to each of the cache lines, and determines the cache line in which data that has been read is to be stored on the basis of the GPU 10 connected to the memory 20 from which the data been read, and then stores the data in the determined cache line.

In this case, when assignment of the cache lines to the GPUs 10 is determined, control may be performed such that data from the memory 20 of a particular one of the GPUs 10 will be preferentially cached on the basis of a result, collected in advance, of an execution profile of an application to be executed.

Further, in a mode of the present embodiment, each of the SE 21, the TU 22, and the RB 23 may contain an L0 or L1 cache, which is not illustrated in the figures. In this example, the cache 24 external to the SE 21, the TU 22, and the RB 23 functions as an L2 cache. In addition, in this example, the L0 or L1 cache contained in each of the SE 21, the TU 22, and the RB 23 may operate as a cache at a level higher than that of the cache 24 functioning as the L2 cache and intervene between the cache 24 and a functional block (i.e., a core), included in each of the SE 21, the TU 22, and the RB 23, for operating as the SE 21, the TU 22, or the RB 23. In this example, the abovementioned flag and the above-mentioned configuration flag are used only in the cache 24 functioning as the L2 cache.

Each of the L3 caches 27 intervenes between the bus fabric 11 and the memory 20 connected to the GPU 10 to which the bus fabric 11 belongs, intercepts an access to the memory 20 by the bus fabric 11, and operates as a cache memory for the memory 20.

<Operation>

The present embodiment basically has the above-described configuration, and accordingly, the CP 12a of the representative GPU 10a, for example, reads a command stream that the CPU 30 has stored at a given address in one of the memories 20 and 31 via the bus fabric 11a of the GPU 10a. This reading of the data may be accomplished by reading the data cached in any of the L3 caches 27.

The CP 12a decodes the command stream, and identifies a process to be performed through the decoding. Then, the CP 12a determines which rendering processing unit 25 of which GPU 10 is to perform the identified process, and performs dispatching of the process.

Then, an instruction to perform the process and data necessary for the process (or an address at which the data is stored, or the like) are sent to the rendering processing unit 25 that has been determined to perform the process. At this time, the sending of the instruction and the data is performed through the inter-chip interconnect CY.

In addition, the GE 13a of the representative GPU 10a performs processes as a surface shader, such as tessellation, which converts a surface of a three-dimensional virtual object (i.e., a 3D object) which the GE 13a is instructed by the CPU 30 to render to more detailed primitives. Then, results of the processes are outputted to the GEs 13b, 13c, . . . of the other GPUs 10b, 10c, . . . via the inter-chip interconnect CY.

Each of the GEs 13b, 13c, . . . of the other GPUs 10b, 10c, . . . outputs information, such as the result of tessellation received from the GE 13a, to the corresponding rendering processing unit 25 of the GPU 10 to which the GE 13 itself belongs.

Then, the rendering processing units 25 of the respective GPUs 10 perform rendering processes in parallel. Results of the processes performed are stored in frame buffers secured in the memories 20 and 31 connected to the GPUs 10 and the CPU 30, respectively, via the bus fabrics 11 of the respective GPUs 10.

The data stored in the frame buffers is, for example, read by the CPU 30, and is outputted to an image display processing section, which is not illustrated in the figures, to be displayed/outputted on a display or the like.

In the present embodiment, the bus fabrics 11 of the respective GPUs 10 are connected to one another via the inter-GPU interconnect CX, and share the memories 20 and the memory 31 connected to the CPU 30 such that these memories together form a single memory space accessible to all. In addition, the control units 14, which need to refer to contents of processes performed in other GPUs 10, are connected via the inter-chip interconnect CY such that data can be transferred therebetween. This enables the plurality of GPUs 10 to cooperate to advance a procedure as if the GPUs 10 were a single GPU.

Examples of Interconnects

Note that each of the inter-GPU interconnect CX and the inter-chip interconnect CY may sample signals (i.e., RAW values) transferred via a signal line of a corresponding intra-chip interconnect in the GPU 10, and send a data frame including information obtained by the sampling to another GPU 10 (or the CPU 30), while the receiver may perform desampling to restore the RAW values, and output the RAW values onto a signal line of a corresponding intra-chip interconnect in the GPU 10.

Here, the signals to be sampled may include not only signals on a data bus but also control signals. That is, examples of signal lines of intra-chip interconnects from which signals are sampled include signal lines of a main data interconnect for transferring main data (which may include signals of a cache coherent protocol), crossbars between the SE 21 (e.g., the CU) and the L1 cache, between the L1 and L2 caches, between the L1 cache and the RB 23, and between L1 and distributed L2 caches, interconnects for access from a control core of the GPU 10 to a register of each block of the GPU 10 or the memory 20, such as an memory-mapped input/output (MMIO) access interconnect, interconnects for system control, such as those for power management control, test/debugging (DFT/DFD), and interrupt signals, and interconnects including dedicated lines specific to the respective blocks (e.g., a local data bus, handshake and control lines, and interconnects between the CP 12 and each SE 21, between the RB 23 and the SE 21, and between the GE 13 and each SE 21).

The GPU 10 on the transmitting side includes a buffer, and holds the data frame to be transmitted until a timing at which the RAW values sampled from a signal line of an intra-chip interconnect in the GPU 10 itself are to be sent. An instruction as to the timing of the sending may be issued from the GPU 10 on the receiving side.

The GPU 10 on the receiving side includes a buffer, and holds the received data frame until a timing at which the RAW values obtained by desampling are to be outputted to a signal line of an intra-chip interconnect in the GPU 10 itself. The GPUs 10 that transmit and receive the data frame transmit and receive the data frame according to predetermined flow control, such as credit-based flow control. Note that this flow control is performed independently of handshake signals of a protocol that is used in transfer of data via the intra-chip interconnect including the signal line from which the signals have been sampled.

Note that, in order to reduce unnecessary transfer of information, sampling and generation of a frame may be performed only when a change (a change from 0 to 1 or from 1 to 0) in a signal on the signal line has occurred. Also, note that it may be determined whether sampling is to be performed with reference to a control signal that indicates whether or not the intra-chip interconnect including the signal line from which signals are sampled or a block connected thereto in the GPU 10 is active.

Further, the inter-GPU interconnect CX and the inter-chip interconnect CY may operate asynchronously to each other.

<Cache>

In addition, in the present embodiment, the cache 24 included in the rendering processing unit 25 may hold, with respect to each of the cache lines, information that identifies the GPU 10 (or the CPU 30) connected to the memory 20 (or the memory 31) from which data stored in the cache line has been read, from among the memory 20 connected to the GPU 10 to which the cache 24 itself belongs and the memories 20 connected to the other GPUs 10 (and the memory 31 connected to the CPU 30). This information is used in a process for cache coherence.

Further, the CP 21 of the GPU 10 may assign, to each of the cache lines included in the cache 24, one of the GPUs 10 (or the CPU 30) in advance so that data read from the memory 20 connected to the assigned GPU 10 (or the memory 31 connected to the assigned CPU 30) will be stored in the cache line. In this example, data read from the memory 20 connected to a given GPU 10 will be stored in the cache line that has been assigned to store data read from the given memory 20.

Features of the Present Embodiment

In addition, features of the information processing system according to the present embodiment can be described as follows. That is, the present embodiment provides a method for implementing a large-scale image processing system having performance scalability virtually using multiple chips.

In addition, features thereof are as follows.

The image processing system is constructed using a plurality of chips and has "inter-chip interfaces that enable memories individually possessed by the respective chips to be together treated virtually as a single memory" and "inter-chip interfaces for enabling processes that cannot be easily handled via distributed processing to be performed via cooperation among the chips."

Inter-GPU connection ports (CX) and (CY) operate asynchronously in accordance with different protocols.

The inter-GPU connection ports (CY) establish connection of the CPs and the GEs alone.

In distributed processing of the CPs and the GEs in a series of chips, a configuration that provides the minimum/shortest inter-chip transfer is selected.

A CP and GE distributed processing method as employed in a plurality of GPU chips is adopted within one GPU chip as well to enable the one GPU chip to perform a plurality of application processes simultaneously through space division.

On the assumption of a CP and GE distributed processing method in a plurality of GPU chips, the GPUs may be divided into chips A, B, and C assigned different functions.

A cache line of the GPU may be provided with a flag that indicates the chip data from which is cached therein.

A cache line of the GPU may be assigned a chip data from which is to be cached therein.

Thus, dynamic performance scalability can be provided (e.g., segmented processing within one chip and parallel processing by a plurality of chips can be made possible).

A construction of a multi-chip system that statically has performance scalability is made possible.

An interconnect technology (hereinafter referred to as an interconnect technology involving sampling) in which RAW values of a signal on an intra-chip interconnect are sampled and sent to another GPU, while the other GPU obtains the RAW values through desampling of information received therefrom, and outputs the RAW values to an intra-chip interconnect in the other GPU itself, may be applied to the abovementioned multi-chip connection.

The disclosure of the description and drawings of Japanese Patent Application No. 2019-189027 is hereby incorporated by reference herein.

In more detail, the present embodiment is directed to an information processing system provided with inter-GPU connection ports (CX) and (CY), supporting a method for dividing GPUs each capable of operating even singly into A, B, and C having different functions, supporting a method for increasing cache efficiency of distributed memory, and supporting a method that implements distributed processing of CPs and GEs, and which allows a flexible hardware configuration, from space division within one chip to simultaneous use of a plurality of chips, and which allows one or more applications having different performance requirements to be executed in parallel through mapping using a programming model for one GPU as it is.

Figure 4:
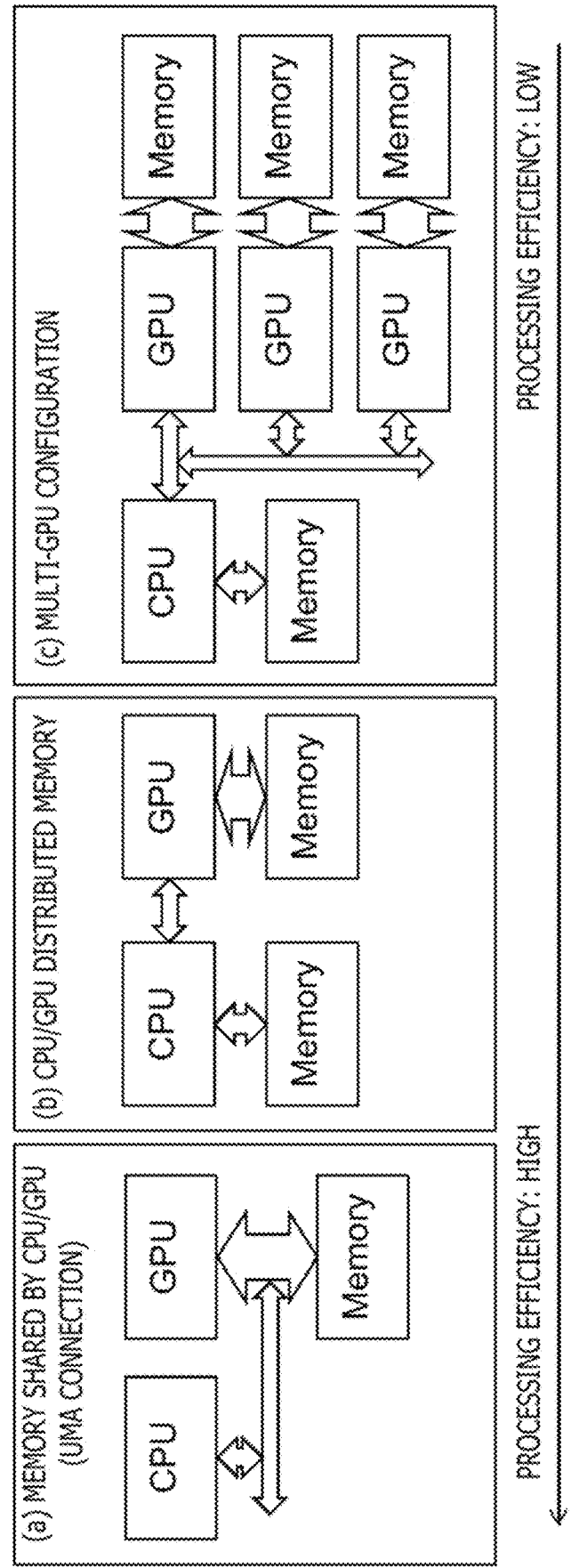
FIG. 4 is an explanatory diagram illustrating example configurations of systems using a GPU(s) in the related art.

Background art for this embodiment is as follows. That is, as illustrated in FIG. 4, in a case where an image processing system that uses a GPU chip needs an improvement in performance, it is common to use a GPU chip having improved performance. One GPU chip performs image processing (in particular, a 3D graphics rendering process) while using a high-bandwidth and large-capacity memory directly connected to the GPU chip on the basis of instructions from software that operates on a CPU. That is, in the related art, data that the GPU chip needs is held in the memory directly connected to the GPU chip. However, the scale that can be implemented by one chip is limited due to factors such as manufacturable scale and power density. In a case where there is a desire for a further improvement in performance, it is conceivable to use a plurality of GPU chips at the same time in one system, but this approach has several problems.

When 3D graphics are rendered in real time according to processing of CPU software, one frame is rendered and outputted to a frame buffer on a memory while information regarding all objects included in one scene that is dynamically determined is grasped in processing on the GPUs. This series of processes involves many dependence/reference relationships, and it is not easy to divide the processes among the plurality of GPU chips and memories connected individually thereto and separated from one another. Resolution of the dependence/reference relationships among the plurality of GPU chips and the separated memories is difficult, which makes it difficult to improve processing performance (FIG. 4(c)). To develop software that is capable of appropriately distributing 3D graphics rendering processes is also difficult.

Incidentally, in a case where general-purpose computing, which is one usage of GPUs, is performed, unlike the case with rendering of 3D graphics, distributed processing among a plurality of GPU chips can sometimes be implemented. This is because such processes do not require a high degree of real-time capability, and can be performed by employing a technique similar to a technique employed in distributed processing among a plurality of CPUs. However, only a limited rate of performance improvement can thus be achieved.

Note that a configuration in which one large-capacity memory is shared by a CPU and a GPU (UMA: Unified Memory Architecture, FIG. 4(a)) is superior to a configuration in which a CPU and a GPU have individual memories separated from each other (FIG. 4(b)) in terms of processing efficiency, performance, and the degree of difficulty in software development. However, the scale that can be implemented therewith is also limited due to factors such as manufacturable scale and power density.

In contrast, GPUs 51 used in an information processing system according to the present embodiment have a configuration illustrated in a next figure, FIG. 5(a).

As illustrated in FIG. 5(b), each of the GPUs 51 has ports (X) capable of direct access to memories 52 of the other GPUs 51 similarly to a memory 52 of the GPU 51 itself.

In addition, as illustrated in FIG. 5(b), the GPU 51 has ports (Y) capable of direct connection of internal communications necessary for integrated processing between a CP (Command Processor) and a GE (Geometry Engine) of the GPU 51 itself and corresponding blocks in the other GPUs 51.

Further, as illustrated in FIG. 5(b), the GPU 51 has a direct access port (Z) for sharing its own memory with a CPU 53 (UMA).

Through connection via these ports, the GPUs 51 are able to cooperate to advance a procedure as if the GPUs 51 were a single GPU (virtually, a configuration similar to that of FIG. 4(a) in the related art).

In software development, a programming model as used in a case where a single GPU is used (FIG. 4(a) in the related art) suffices.

It is possible to construct systems each having different performance by changing the number of GPUs connected in one system, even with the same architecture and the same programming model.

It is possible to dynamically execute applications having different performance requirements by changing the range in which the GPUs are active in one system.

Here, each GPU has a capability to operate as a single GPU on its own.

Note that the ports (X) correspond to the above-described interconnect CX, the ports (Y) correspond to the above-described interconnect CY, and the port (Z) corresponds to the above-described interconnect CZ. Also, note that the numbers of GPUs 51, CPUs 53, and memories 52 connected in parallel, the internal configuration of the GPUs 51, and the topology of connection of chips are not limited to the examples here.

Figure 6:
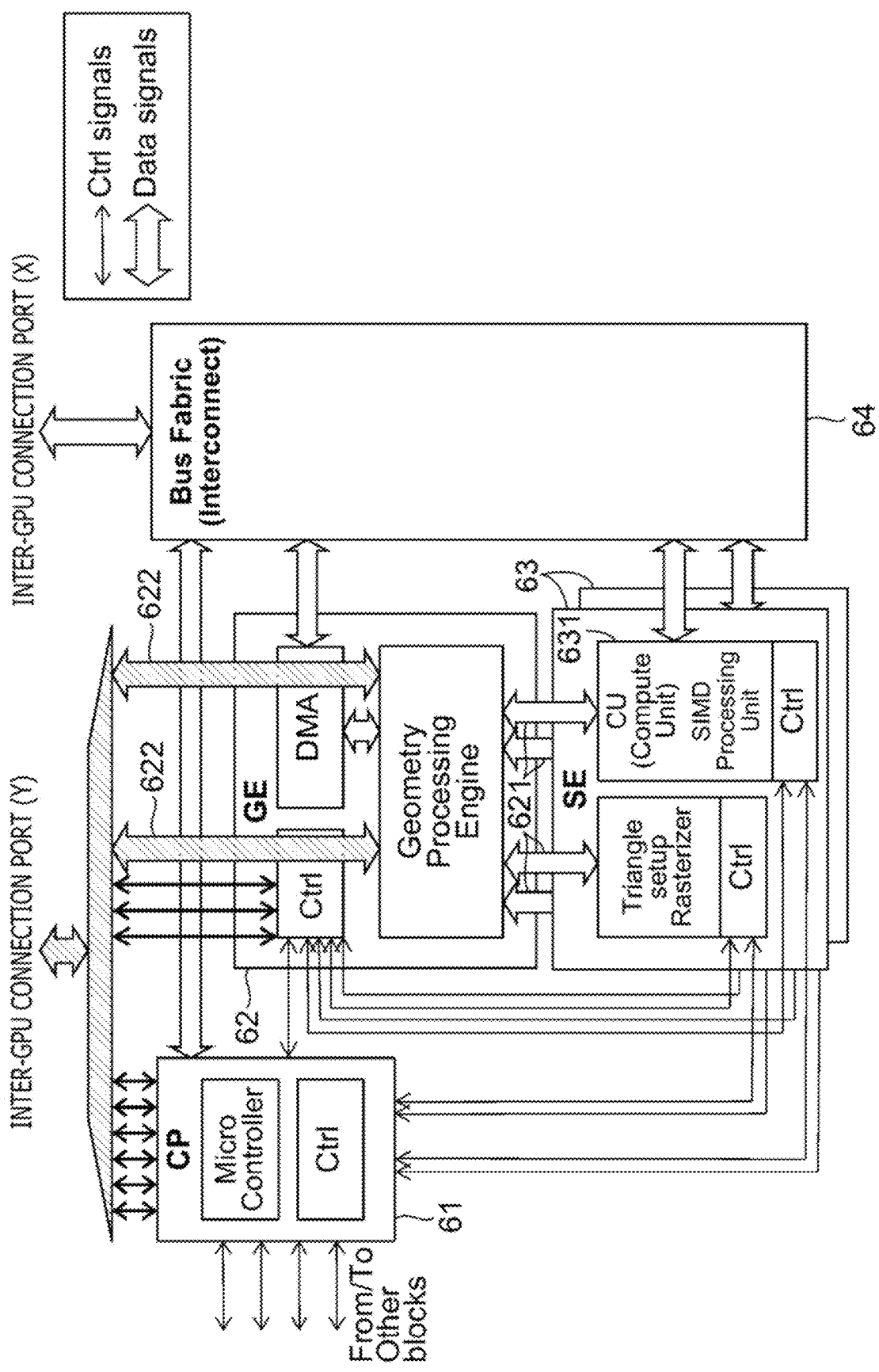
FIG. 6 is a block diagram illustrating an example internal configuration of a GPU according to the embodiment of the present invention.

FIG. 6 illustrates a configuration in which components are depicted in more detail. The components in this figure are as follows. Note that, in the drawings used in the following description, relatively thick arrows represent data signal lines, while thin arrows represent control signal lines (Control Signal).

CP (Command Processor) 61: Processing to be performed by the GPU is designated as a result of a command stream (i.e., a group of requests for primitive rendering and general-purpose computing) generated by the CPU being placed in a queue on the memory. This command stream is fetched and decoded by a CP 61 of the GPU, and is resolved into more primitive processes as necessary, and these are performed through dispatching thereof to a Shader Engine 63 (SE, containing a Compute Unit (CU) 631) and so on. The CP 61 manages execution flows in general, including the order of priority of process requests issued within the GPU, termination and synchronization processes, and management of threads, thereby performing overall control over processes of the whole GPU. In a case where a plurality of SEs 63 or the like are arranged in parallel within one GPU, the CP 61 places all of the SEs 63 or the like under the overall control, and performs centralized control, including optimization of allocation of processes to respective resources and synchronization processes. Accordingly, in a case where a plurality of chips are used to virtually construct a single GPU, the CP 61 needs to perform control while grasping the contents of processes and how resources are used in all the chips. The CP 61 according to the present embodiment includes a microcontroller that executes a code, a scheduler, a DMA that has capabilities of copying and resource management through time/space division, and so on.

GE (Geometry Engine) 62: The Geometry Engine (GE, or Geometry Processor) is a computation block that handles mainly a surface shader, e.g., tessellation, which converts a surface of a 3D object to more detailed primitives. In addition, processes that follow processes by the surface shader, such as processes of a geometry shader which receives input of primitives such as polygons made up of a plurality of vertices and removes and adds vertices, a vertex shader which performs coordinate transformation of vertices, and a primitive shader which integrates these shaders can be performed in parallel, with computation blocks, such as the SEs 63 (CUs 631) and primitive units allocated to respective rendering target regions, i.e., divisions of a screen. However, the GE 62 secures coherence and improves processing efficiency by performing processes collectively with respect to a 3D object prior to region dividing, and needs to operate while delivering and receiving coordinate data before and after tessellation to and from the SEs 63 (CUs 631) (621: while performing input and output). In a case where a plurality of SEs 63 or the like are arranged in parallel within one GPU, the GE 62 needs to be connected to all of the SEs 63 or the like. Accordingly, in a case where a plurality of chips are used to virtually construct a single GPU, the GE 62 needs to be connected to the SEs 63 or the like in all the chips (622), and the GE 62 needs to operate cooperatively while securing overall coherence. The GE 62 executes a vertex shader as necessary in the place of the SE 63. In FIG. 6, "621" and "622" conceptually represent data signal lines for delivering and receiving coordinate data and information as to primitive components.

SE (Shader Engine) 63: The Shader Engine 63 (SE) is a block that takes charge of arithmetic processing of many types of shaders, often has single instruction multiple data (SIMD) computers arranged in parallel, and contains a capability (i.e., a Compute Unit: CU) 631 to perform a plurality of processes in parallel through time/space division using single instruction multiple thread (SIMT) and thread processing. The SE 63 further has a rasterization function of converting polygons to pixel values, and so on. To improve performance, the GPU often contains a plurality of SEs 63 (CUs 631) having the same functions and arranged in parallel. Processes of vertex shaders, pixel shaders, and general-purpose computing can be allocated to the plurality of SEs 63 (CUs 631) in units of rendering target regions, i.e., divisions of a screen, or in general-purpose computation units, and the individual SEs 63 (CUs 631) can easily perform processes that have no cross-reference or dependence relationships therebetween in parallel. A local memory area is mainly used for reading and writing, but a global memory area is sometimes used therefor, and in a case where a plurality of chips are used to virtually construct a single GPU, a path provided in a bus fabric (Bus Fabric) to refer to a memory subordinate to another GPU is used. Note that the SE is sometimes considered to include a TU (Texture Unit), an RB (Rendering Backend), and so on, which will be described below. In the present embodiment, it is assumed that the SE contains Level 0/1 caches and a local memory, that a Level 2 cache is disposed between the SE/TU/RB and the bus fabric, and that a Level 3 cache is disposed between the bus fabric and a DRAM. Note that cache hierarchy and local memories are not illustrated in FIG. 6.

TU (Texture Unit): The TU fetches texture data and other numerical value tables from a memory, and, after subjecting the fetched data to a filtering process if necessary, passes the resulting data to the pixel shader. The GPU often contains a plurality of TUs having the same functions, arranged in parallel, and directly connected to the SEs 63, making it easy to perform processes in parallel in units of rendering target regions, i.e., divisions of a screen. A global memory area is sometimes referred to, and in a case where a plurality of chips are used to virtually construct a single GPU, a path provided in the bus fabric to refer to the memory subordinate to another GPU is used.

RB (Rendering Backend): The RB performs alpha/stencil/depth tests, etc., on pixel values outputted from the pixel shader, and outputs a result of rendering to a frame buffer. The GPU often contains a plurality of Rendering Backends (RBs, or Raster Operations (ROPs)) having the same functions, arranged in parallel, and directly connected to the SEs 63, making it easy to perform processes in parallel in units of rendering target regions, i.e., divisions of a screen. A local memory area is mainly used for reading and writing, but a global memory area is sometimes used therefor, and in a case where a plurality of chips are used to virtually construct a single GPU, a path provided in the bus fabric to refer to the memory subordinate to another GPU is used.

Inter-GPU connection ports (X) and (Y): The inter-GPU connection ports (X) and (Y) operate asynchronously to each other. The inter-GPU connection ports (X) and (Y) may employ the interconnect technology involving sampling. The inter-GPU connection ports (X) and (Y) may be multiplexed on a single physical interface for transfer. The interconnect technology involving sampling can be implemented either through packetized transfers and multiplexing or through time division multiplexing of an interface. In the inter-GPU connection port (Y), notification/observation and handshake signal lines used in the CP and GE block may be additionally provided as sideband signals.

Bus Fabric (Interconnect) and inter-GPU connection port (X): A plurality of CPU/GPU chips that are operating share a common global address space, and are each grasping the address areas to which resources of the chip itself are allocated. Memory spaces individually possessed by a plurality of GPU chips can be allocated to a single continuous address area. This allocation may be either static or dynamic. In addition, the paging method may be employed using an MMU or the like.

When a request for a memory access has been received from any block in the GPU, it is determined whether this access is an access to a memory subordinate to the GPU itself or an access to a memory subordinate to another GPU on the basis of an access target address, and in a case where this access is an access to a memory of another GPU chip, data transfer is performed via the inter-GPU connection port (X).

In a case where a plurality of routes are available for an access to a memory subordinate to another GPU chip to be accessed in inter-chip connection, a plurality of CPU/GPU chips that are operating grasp connection relationships thereof and are able to select the shortest route in terms of data transfer.

The cache contained in the SE/TU/RB (in the present embodiment, an L0/L1/L2 cache of the cache 24) is capable of caching of accesses to its own chip and external chips. The inter-GPU connection port (X) supports a cache coherent protocol as necessary, so that the L0/L1/L2 caches can maintain data coherence between the chips.

The cache contained in the SE/TU/RB may have, in each of cache lines, a flag that indicates whether data cached therein is data from its own chip or data from another chip. The flag may be made up of only one bit and indicate whether or not the data is from its own chip, or may be made up of multiple bits and be capable of identifying a plurality of chips. In the replacement process for the cache line, control may be performed such that a result of caching from a particular chip will be preferentially left. In the replacement process for the cache line, control may be performed such that a result of caching from a particular chip will be preferentially left on the basis of a result of an execution profile of each application collected in advance.

The cache contained in the SE/TU/RB may have, with respect to each of the cache lines, a flag capable of specifying either its own chip or another chip as a chip data from which is to be cached therein. The flag may be made up of only one bit and indicate whether or not the chip is its own chip, or may be made up of multiple bits and be capable of identifying a plurality of chips. In a process of assigning the cache lines to the respective chips, control may be performed such that data from a particular chip will be preferentially cached on the basis of a result of an execution profile of each application collected in advance.

This cache has, for example, the following structure. The cache contains a plurality of cache lines, an address comparator, and a way switch. In addition, one cache line has a pair of tags and a data line. The tags are, for example, 64 bits long, and have a tag of a cache target address, a replace-rule-control bit, parity/ECC bits, a control bit such as a line lock bit and, a bit that indicates the chip the memory of which is a target of caching.

Meanwhile, the data line is, for example, 288 bits long, and has 256-bit caching data and parity/ECC bits made up of 32 bits. When the cache has 128 cache lines having the abovementioned bit lengths, for example, the cache is a total of 32 kilobytes in size.

Bus Fabric: In a case where the chip is provided with a plurality of separate local memories, separate caches (in the present embodiment, L3 caches), contained in the chip for the local memories, are provided for the respective local memories. Each L3 cache caches only data for the memory directly subordinate to the cache itself and does not allow data for the same memory area to be held in other L3 caches at the same time.

Figure 7:
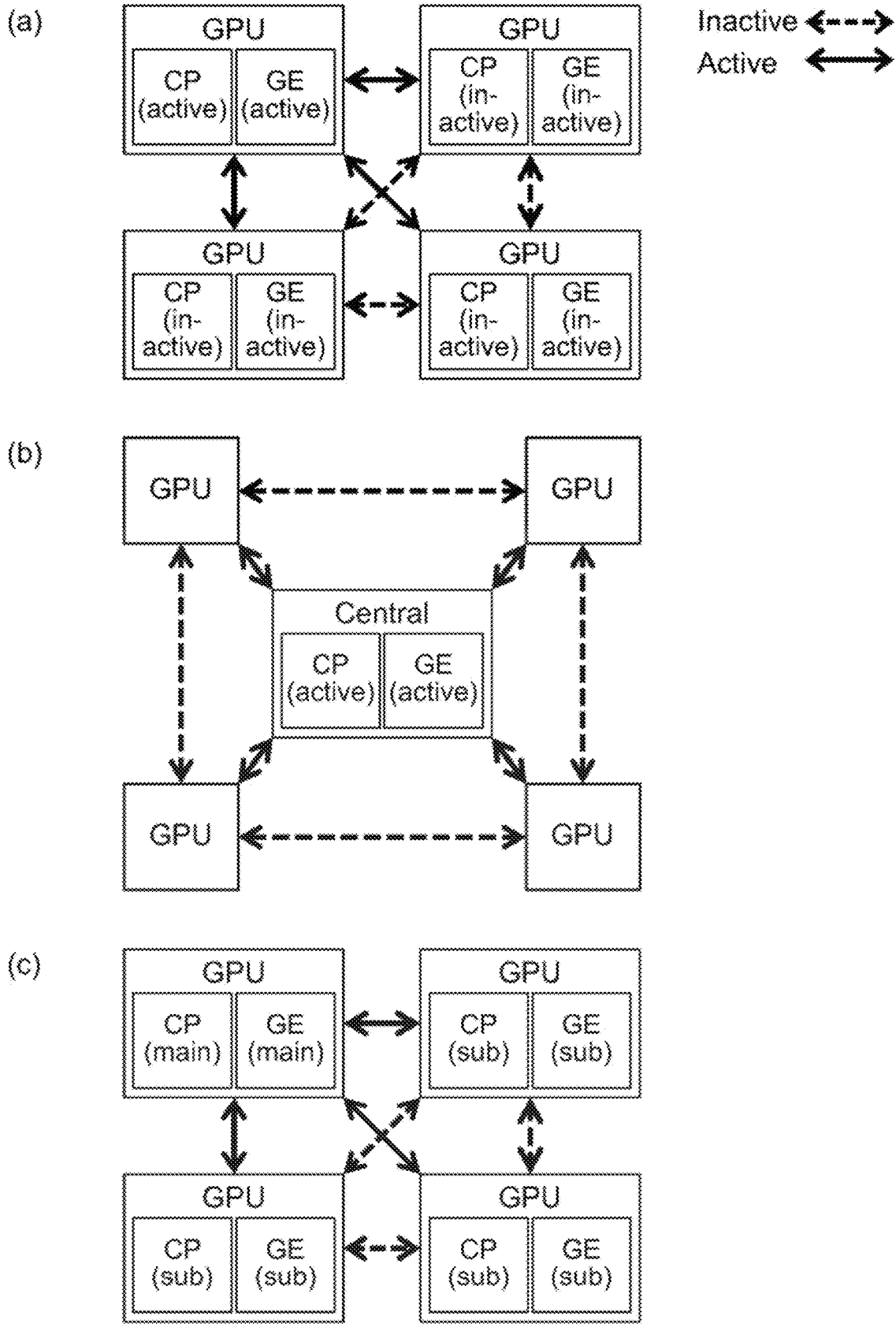
FIG. 7 represents explanatory diagrams illustrating examples of methods for constructing a single virtual GPU using a plurality of GPUs according to the embodiment of the present invention.

FIG. 7 represents explanatory diagrams illustrating examples of how a single virtual GPU is constructed using a plurality of GPUs according to the present embodiment.

Here, the following transfers are performed via the inter-GPU connection ports (Y).

Inter-GE transfers using the inter-GPU connection ports (Y): Coordinate data of a shader before and after tessellation or the like, information as to connection between primitives in an object, the operation status ("running," "stopped," "waiting for synchronization," "waiting for data," "abnormal state," or the like) of each of GE computers, synchronization handshake, and so on.

Inter-CP transfers using the inter-GPU connection ports (Y): A process dispatch instruction content, instructions as to the order of priority, the operation statuses ("running," "stopped," "waiting for synchronization," "waiting for data," "abnormal state," or the like) of blocks such as the SEs, synchronization handshake, and so on.

Distributed processing of the CPs and the GEs: In a case where a plurality of GPU chips are used to virtually construct a single GPU, the CP and GE block included in each GPU chip operates according to one of the following methods (1) to (3).

In each case, in distributed processing of the CPs and the GEs in a plurality of chips, a configuration/route that provides the minimum/shortest inter-chip transfer is selected (concerning active/main selection as to the CPs and the GEs, and selection of the inter-GPU connection ports (Y)).

In the method (1), the CP and the GE of a particular chip perform direct overall control (main) to maintain consistency in processing (FIGS. 7(a) and 7(b)). At this time, a controller included in the CP of the particular chip is used as a responsible entity for control management. In addition, a computer included in the GE of the particular chip is used as a responsible entity. The CPs and the GEs of the other chips perform only interfacing processes in relation to the SEs of the respective chips.

In the method (2), the CP and the GE of a particular chip perform indirect overall control to perform distributed processing so as to maintain consistency in the processing (FIG. 7(c)). At this time, a controller included in the CP of the particular chip performs hierarchical control with a controller of the CP of each of the chips placed under the command thereof. In addition, the GEs of the chips are combined to function as if they were a single GE to perform arithmetic processing in parallel. On the basis of the range in which the GPUs are operating, the number of blocks that are caused to operate as subordinates (subs) is selected according to required processing capacity of the CPs and the GEs.

Note that, in each of the methods, both the CP and the GE in the same chip may not necessarily perform the overall control.

Figure 8:
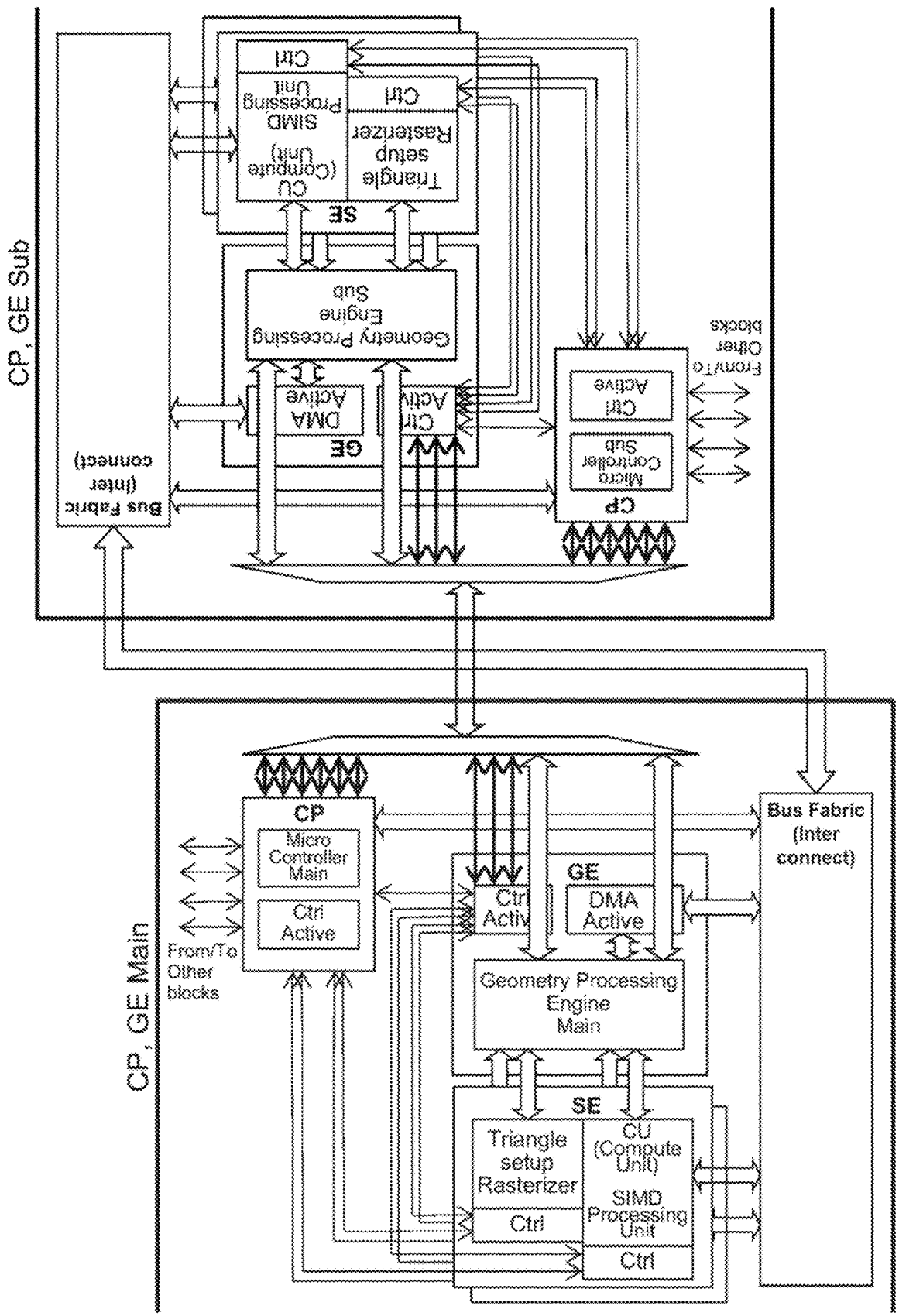
FIG. 8 is an explanatory diagram illustrating an example of distributed processing of a plurality of GPUs according to the embodiment of the present invention.
Figure 9:
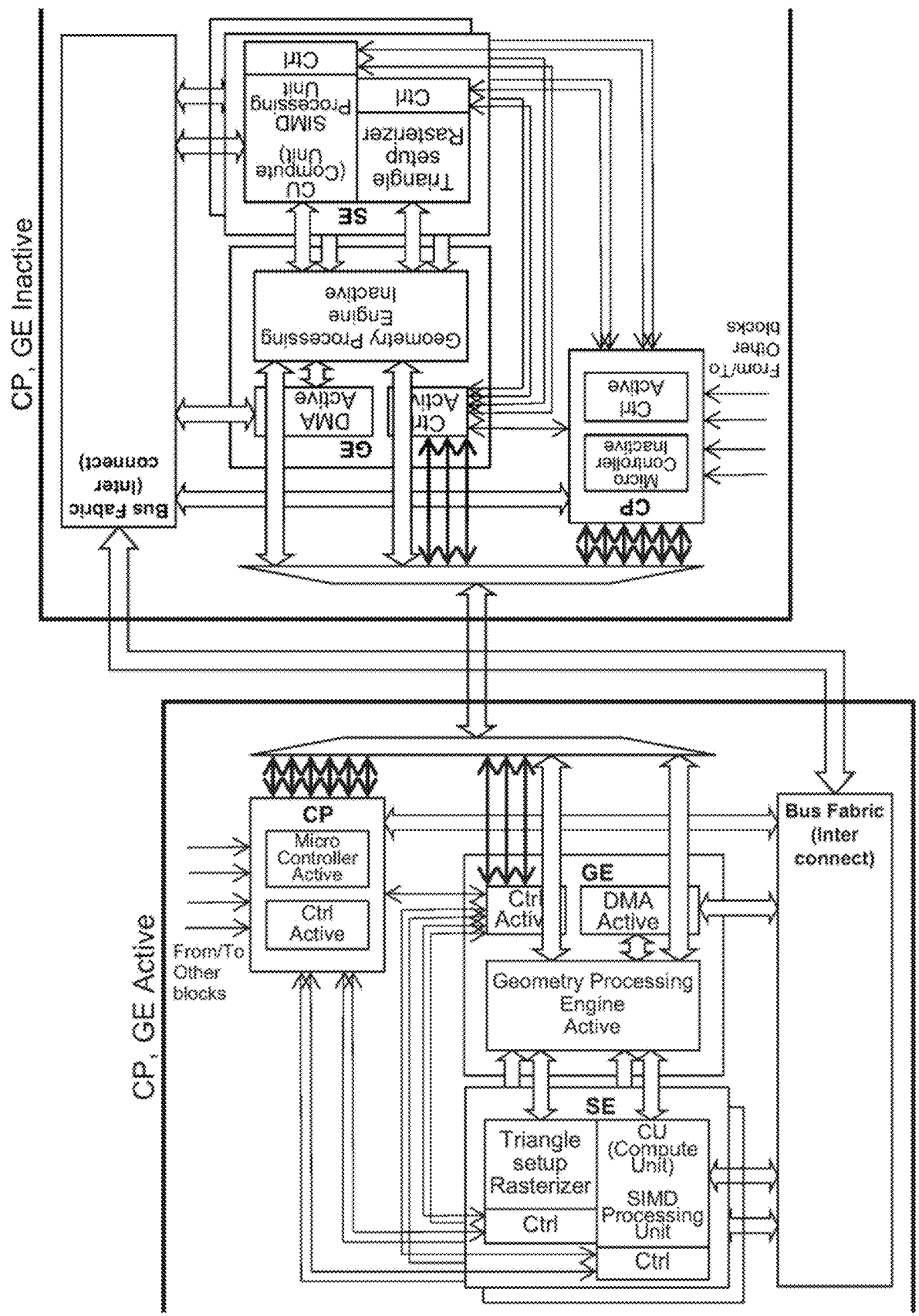
FIG. 9 is another explanatory diagram illustrating an example of distributed processing of a plurality of GPUs according to the embodiment of the present invention.

FIGS. 8 and 9 are explanatory diagrams illustrating flows of specific signals in the methods (1) and (2), respectively.

In addition, FIGS. 10(a) and 10(b) illustrate examples of operations of the method (3). In the method (3), four separate CPs and four separate GEs are provided in one GPU chip, and distributed processing is implemented by employing methods similar to the methods (1) and (2). Use of this enables a plurality of applications to be executed on one GPU through space division. Note that, also in this method, a CP and a GE in the same chip may not necessarily perform the overall control.

FIGS. 11 to 16 illustrate several modes of methods for constructing one virtual GPU or scalable GPU. In the following examples, a chip A mainly contains graphics/compute frontends and an overall control system. The chip A has a system for processing that is performed across the whole GPU and for which parallelization is difficult. The chip A may be integrated with an I/O hub die. Functions may be multiplexed to eliminate the chip A, and each of chips B may be assigned functions of the chip A (embodiment 1b). A logic circuit that operates at a high speed is mainly constructed next to the chip B, and is, as necessary, integrated with an on-chip interconnect for connection between chips or an I/O hub chip that forms a hub of a peripheral interface to provide a combination that maximizes a benefit when a silicon process for a logic circuit that is excellent in terms of cost performance is adopted.

Meanwhile, the chip B mainly contains a shader engine (a unified shader, a programmable graphics computer), a rasterizer, a rendering backend (a raster operation such as Z/Stencil/Blend), a local memory, L0/L1/L2 caches, and so on. Functions involving high computation parallelism are mainly implemented. Computers caused to operate at a high speed, a hard-wired logic, high-speed L0/L1 caches, and so on are mainly implemented to provide a combination that maximizes benefits of the chip area and performance (e.g., operating frequency, power consumption, etc.) when a silicon process for a high-performance logic circuit most advanced in fineness is adopted.

A chip C mainly includes physical layers (PHYs) and large-capacity cache memories (using on-chip static random access memory (SRAM), extended dynamic random access memory (eDRAM), magnetic random access memory (MRAM), ferroelectric random access memory (FeRAM), etc.). A silicon process that is advantageous in a case where analog circuits, such as PHYs, and large-capacity on-chip memories (e.g., SRAM, eDRAM, MRAM, resistive random access memory (ReRAM), FeRAM, etc.) are integrated is adopted.

Figure 11:
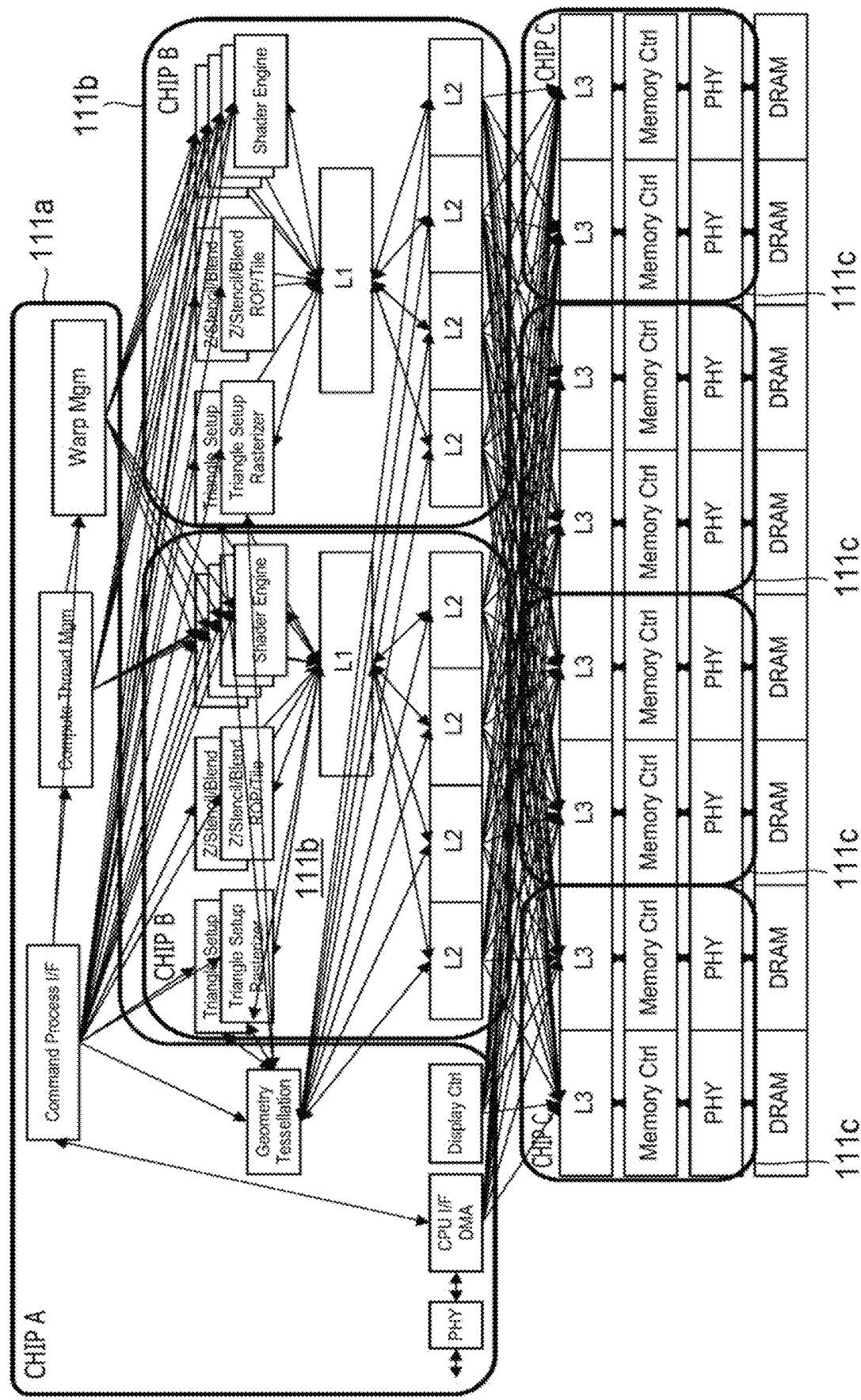
FIG. 11 is an explanatory diagram (1) illustrating an example mode in which one virtual GPU or scalable GPU is constructed using GPUs according to the embodiment of the present invention.

Specifically, FIG. 11 illustrates an example in which one GPU is implemented using the three types of chips. In FIG. 11, a chip A 111a, chips B 111b, and chips C 111c, which are different types of GPU chips, are illustrated. Here, on-chip interconnects that extend between the chips may be provided with components (referred to as wrappers) for sampling, modulating, and transmitting signals on a signal line in the chip on the transmitting side, decoding the signals on the receiving side, and outputting the signals onto a corresponding signal line in the chip on the receiving side. In the example of FIG. 11, one chip A 111a, two chips B 111b, and four chips C 111c are combined to construct one GPU.

Figure 12:
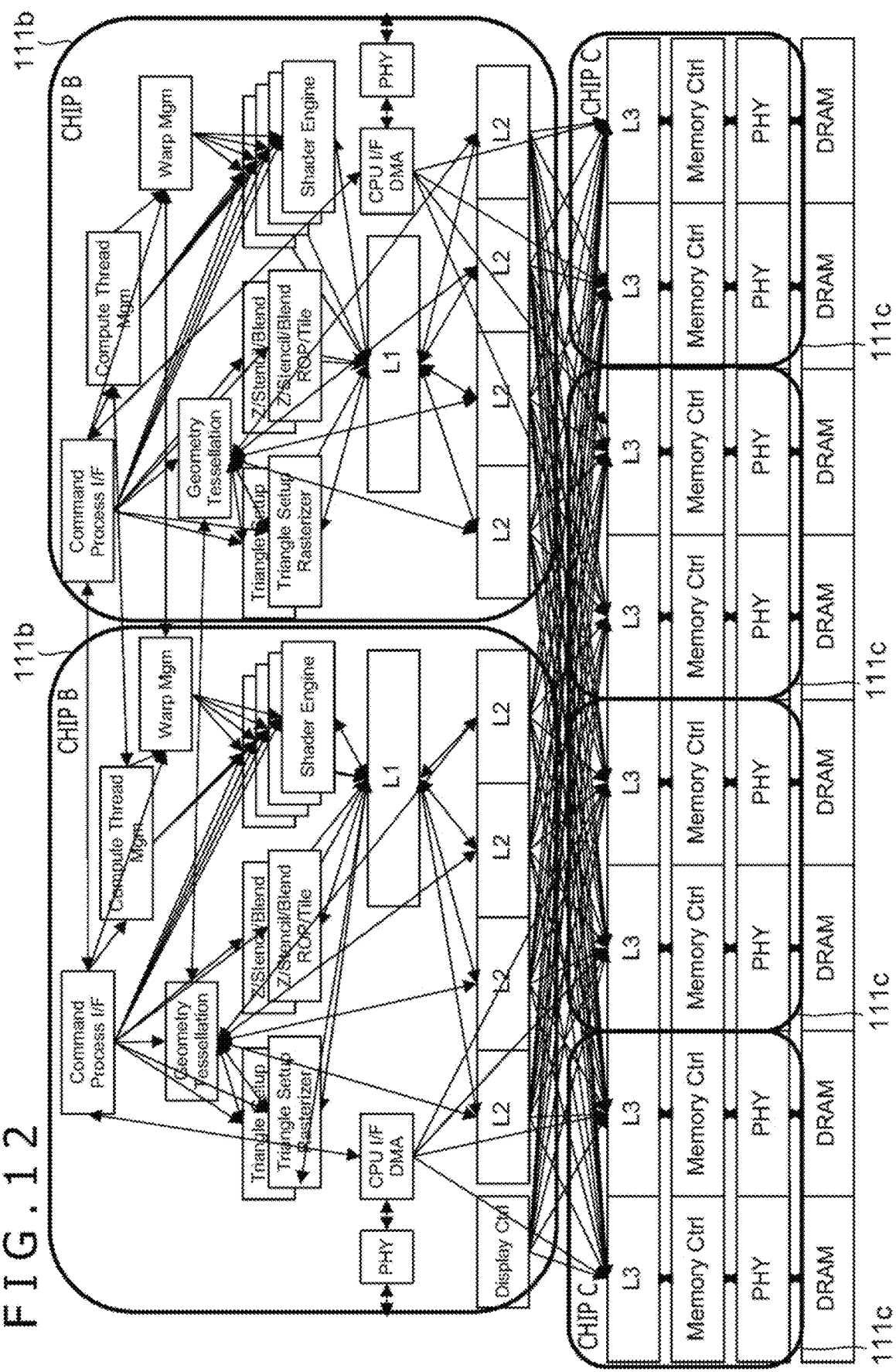
FIG. 12 is an explanatory diagram (2) illustrating an example mode in which one virtual GPU or scalable GPU is constructed using GPUs according to the embodiment of the present invention.

In addition, FIG. 12 illustrates an example in which one GPU is constructed using two types of chips (i.e., chips B and C). In FIG. 12, chips B 111b and chips C 111c are illustrated as the two types of chips. Also in this example, on-chip interconnects that extend between the chips may be configured to use wrappers to sample, modulate, and transmit signals on a signal line in the chip on the transmitting side, decode the signals on the receiving side, and output the signals onto a corresponding signal line in the chip on the receiving side. In the example of FIG. 12, two chips B 111b and four chips C 111c are combined to construct one GPU.

Figure 13:
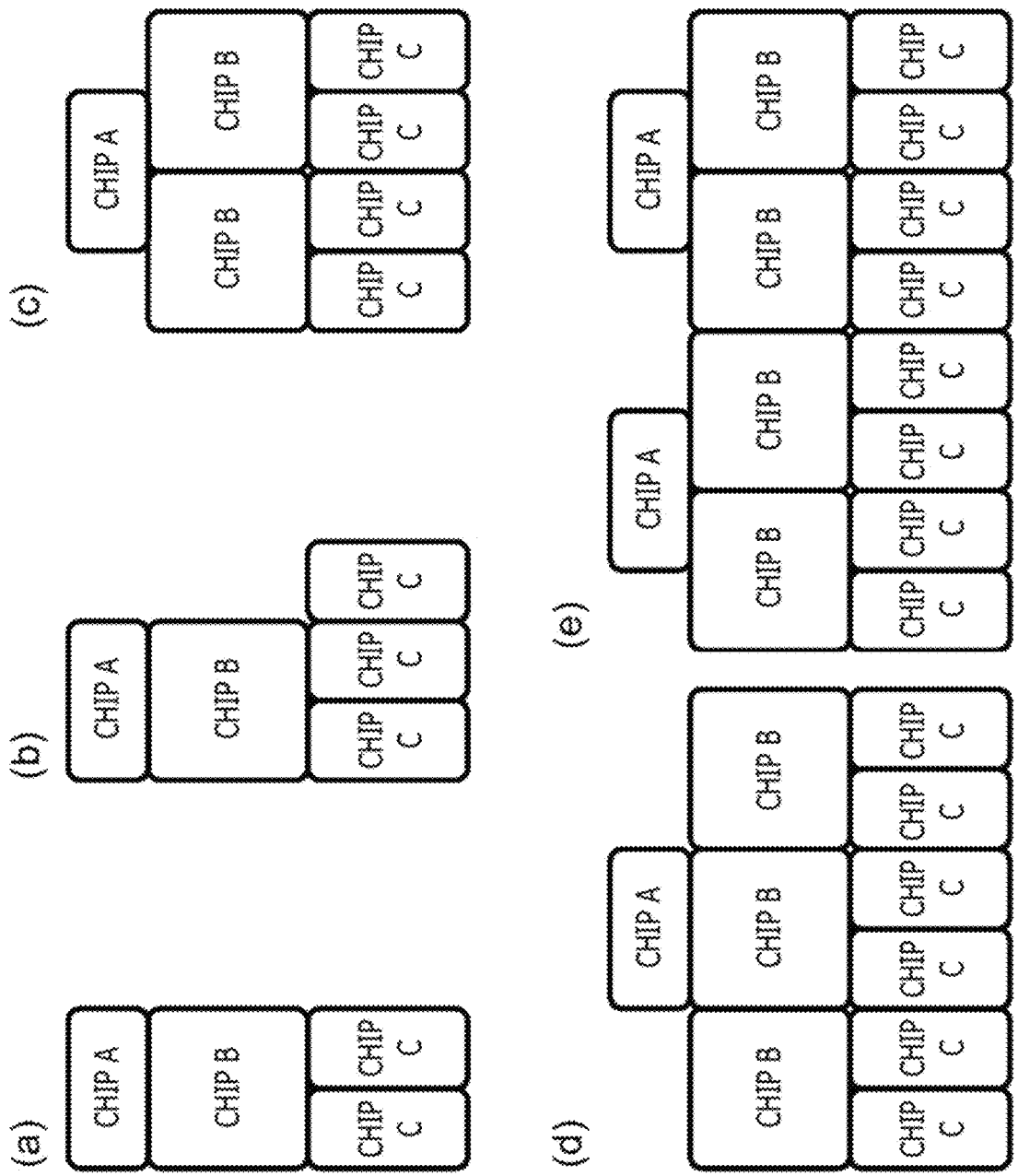
FIG. 13 represents explanatory diagrams (3) each illustrating an example mode in which one virtual GPU or scalable GPU is constructed using GPUs according to the embodiment of the present invention.

In addition, as illustrated in FIG. 13, for example, in a case where a scalable GPU using a large number of chips is constructed, a flexible configuration can be adopted in accordance with performance and functions required in the system. FIG. 13 illustrates an example configuration in a case where the GPU is used in a portable device (FIG. 13(a)), an example configuration in a case where the GPU is constructed as one GPU module (FIG. 13(b)), an example configuration in a case where the GPU is used in a home console or the like (FIG. 13(c)), an example configuration in a case where the GPU is constructed as a GPU module having higher performance (FIG. 13(d)), and an example configuration in a case where the GPU is used in a server or the like (FIG. 13(e)).

Note that, in the examples of FIGS. 11 to 13, each of the types of GPU chips (i.e., the chips A, B, and C) contains a required number of wrappers for connection of on-chip interconnects on the basis of the number of opposed chips that can be connected therewith. Some of the wrappers contained therein may not be used in a case where the number of chip combinations in a system configuration is smaller than the maximum number of connections that can be established.

As illustrated in FIG. 14, in a case where a plurality of types of chips A, B, and C as presented here are used, a 2-GPU system (FIG. 14(a)) can be implemented by a configuration illustrated in FIG. 14(b) (identical to FIG. 13(e)). Similarly, a 4-GPU system illustrated in FIG. 14(c) can be implemented by a configuration illustrated in FIG. 14(d). FIG. 14(b) is applicable to the configuration of one server node or the like, while FIG. 14(d) is applicable to the configuration of one large (big) server node or the like. In addition, a system as illustrated in FIG. 15(a) can be implemented by a configuration illustrated in FIG. 15(b).

FIG. 16 represents explanatory diagrams illustrating examples of packaging of GPUs that are scalable using a large number of chips. FIG. 16(a) illustrates an example in which a GPU 1601 as illustrated in FIG. 13(c) is constructed as one package. Here, the GPU 1601 and a CPU 1602 are formed using an RDL (Re-Distribution Layer).

Meanwhile, FIG. 16(b) illustrates an example in which a GPU as illustrated in FIG. 13(e) is constructed using two GPU packages (part GPUs) 1610 and 1611. In this example, the chips A, B, and C arranged in each of the GPUs 1610 and 1611 are connected to one another via a silicon interposer. In FIG. 16, the silicon interposers are represented by hatched rectangles. In addition, CPUs 1612 are each formed using an RDL (Re-Distribution Layer).

FIGS. 17 to 21 represent explanatory diagrams illustrating examples in which a plurality of applications are executed through time division and/or space division using the GPUs according to the present embodiment. Here, in a case of a time division (Temporal partitioning) method (FIG. 17(a)), if each GPU has a performance of 40 tera floating-point operations per second (TFLOPS), for example, four applications would operate through time division with approximately 10 TFLOPS available to each application. The time division method as illustrated in FIG. 17(a) has a problem in that, without a hardware solution, context switching would involve much overhead. For example, the time division method is not suitable for a large number of (non-preemptive) processes that cannot be temporarily suspended and which are performed in synchronism when a game application is executed. That is, the time division method is not suitable in a case where small-scale (small-granularity) context switching frequently occurs.

Meanwhile, similarly, in a case of a space division ("Hardware partitioning" (Spatial partitioning)) method as conceptually illustrated in FIG. 17(b), if each GPU has a performance of 40 TFLOPS, for example, four applications would operate through space division with approximately 10 TFLOPS available to each application. In the example of FIG. 17(b), perfect control and real time processing are possible. In a case where the GPU contains blocks or units that operate in parallel, each of the sections that operate in parallel can be used to cause a plurality of applications to operate.

FIG. 18 illustrates examples in which four GPUs 1801, 1802, 1803, and 1804 are each constructed using one chip A, two chips B, and four chips C. FIG. 18(a) illustrates a case in which a first application App1, which can be executed using one CP and one GE, is executed through space division, and in this case, as illustrated in FIG. 18(c), one CP and one GE among four CPs and four GEs included in the GPU 1801 are made active and perform processes of the application. At this time, all inter-GPU connection ports (X) and (Y) are in an inactive state.

Meanwhile, FIG. 18(b) illustrates an example in which four applications App1, App2, App3, and App4 are executed through space division. It is assumed that processes of each of these applications can be handled by using one CP and one GE. In this example, as illustrated in FIG. 18(d), all of four CPs and four GEs included in the GPU 1801 are made active, and the processes of each application are performed by a separate one of the CPs and a separate one of the GEs. Also in this case, all inter-GPU connection ports (X) and (Y) are in an inactive state.

Note that, when assignment of the CPs and the GEs is changed, context switching is performed to make it possible to maintain progress of processing and to resume the processing.

Figure 19:
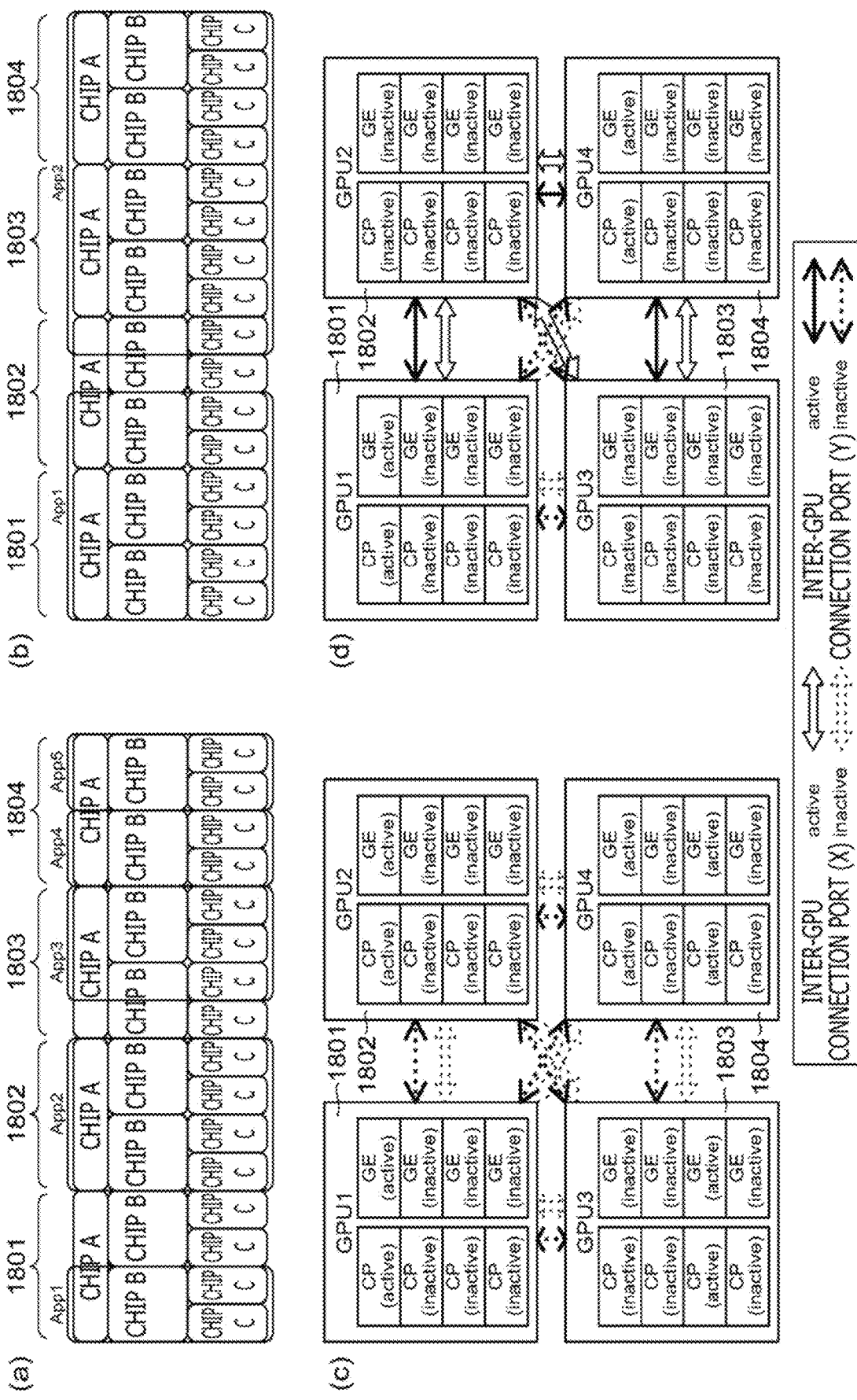
FIG. 19 represents explanatory diagrams (3) each illustrating an example in which a plurality of applications are executed through time division and/or space division using GPUs according to the embodiment of the present invention.

FIG. 19(a) illustrates an example in which five applications App1, App2, App3, App4, and App5 are executed through space division using GPUs having the configuration as illustrated in FIG. 18. In this example, each application requires more resources than in the examples of FIG. 18, but does not require use of resources in more than one GPU chip. Accordingly, as illustrated in FIG. 19(*c*), processes of each application are performed within a corresponding one of the GPU chips 1801, 1802, 1803, and 1804, and some of the CPs and the GEs are made active in each GPU chip. In addition, also in this example, all inter-GPU connection ports (X) and (Y) are in an inactive state.

Meanwhile, FIG. 19(*b*) illustrates an example in which two applications App1 and App2 are executed through space division, and it is assumed here that the application App1 performs processes that employ at least three chips B and six chips C, while the application App2 performs processes that employ nine chips C (and employ five corresponding chips B). Accordingly, the application App1 is executed using the GPUs 1801 and 1802, while the application App2 is executed using the GPUs 1802, 1803, and 1804 (FIG. 19(*d*)). In this example, because processes that involve use of two or more GPUs are performed, a main CP and a main GE for executing each of the applications are made active. The figure illustrates an example in which a CP and a GE for the application App1 are made active and operate in the GPU 1801, while a CP and a GE for the application App2 are made active in the GPU 1804. In addition, inter-GPU connection ports (X) and (Y) between the GPU 1801 and the GPU 1802, between the GPU 1802 and the GPU 1803, and between the GPU 1802 and the GPU 1804 are made active, while inter-GPU connection ports (X) and (Y) between other GPU pairs (e.g., between the GPU 1801 and the GPU 1803, etc.) are in an inactive state.

Figure 20:
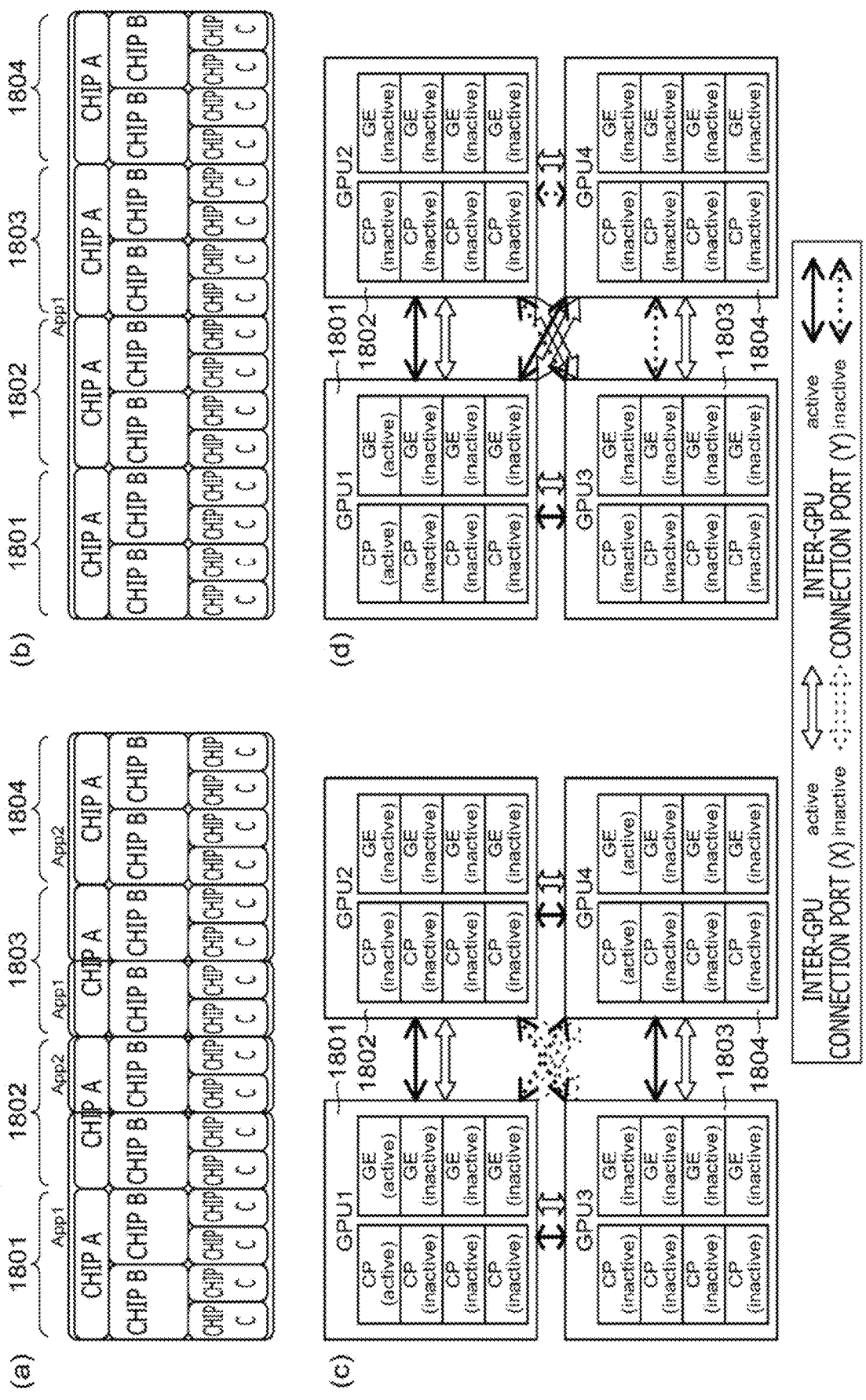
FIG. 20 represents explanatory diagrams (4) each illustrating an example in which a plurality of applications are executed through time division and/or space division using GPUs according to the embodiment of the present invention.

In addition, execution of one application may be assigned to the chips A, B, and C of the GPUs 1801 to 1804 in any manner (FIGS. 20(*a*) and 20(*c*)). Further, all of the GPUs 1801 to 1804 may be used by one application (FIGS. 20(*b*) and 20(*d*)).

For example, processes of an application that can be executed within one GPU alone may be performed using a plurality of GPUs 1801 and 1802 (FIGS. 21(*a*) and 21(*c*)). Note that, in a case where processes that involve use of a plurality of GPUs do not occur, all inter-GPU connection ports (X) and (Y) are in an inactive state (FIGS. 21(*b*) and 21(*d*)) even when sixteen applications operate in parallel (each chip C executes a different one of the applications).

REFERENCE SIGNS LIST

1: Information processing system
10: GPU
11: Bus fabric
12: Command processor
13: Geometry engine
14: Control unit
20: Memory
21: Shader engine
22: Texture unit
23: Rendering backend
24: Cache
25: Rendering processing unit
27: L3 cache

The invention claimed is:

1. A first graphics processor having a first command processor and a first geometry engine and connected to a first memory and a further graphics processor, the first graphics processor comprising:
a first bus fabric that delivers and receives data to and from the first memory connected thereto; and
a first interconnect that is connected to the first command processor and the first geometry engine and that delivers and receives data to and from a second command processor and a second geometry engine of the further graphics processor,
wherein, via a second interconnect, the first bus fabric delivers and receives data to and from a second bus fabric of the further graphics processor and is accessibly connected to a second memory connected to the further graphics processor, and
wherein each of the first interconnect and the second interconnect is an inter-chip interconnect that samples signals transferred via a signal line of the first graphics processor, and sends a data frame including information obtained by the sampling to the further graphics processor.

2. The first graphics processor according to claim 1, wherein the first interconnect and the second interconnect deliver and receive data to and from the further graphics processor asynchronously to each other.

3. The first graphics processor according to claim 1, further comprising:
a plurality of rendering processing units that perform rendering processes,
wherein the first command processor and the first geometry engine cause the plurality of rendering processing units to perform the plurality of rendering processes in parallel on a basis of a predetermined distributed processing control method.

4. The first graphics processor according to claim 1, comprising:
a plurality of caches each of which holds data read from an assigned one of memories connected to the first graphics processor or any other graphics processor,
wherein the first graphics processor holds, so as to be associated with information for identifying at least one cache of the plurality of caches, information for identifying the first graphics processor to which the first memory assigned to the at least one cache of the plurality of caches is connected.

5. The first graphics processor according to claim 1, comprising:
a plurality of caches each of which holds data read from a respectively assigned one of memories connected to the first graphics processor or any other graphics processor,
wherein each of the plurality of caches is assigned a corresponding graphics processor to which a corresponding memory assigned thereto is connected.

6. An information processing system comprising:
a plurality of graphics processors each having a respective command processor and a respective geometry engine and connected to a respective memory, each of the plurality of graphics processors including
a respective bus fabric that delivers and receives data to and from the respective memory connected thereto, and
a first interconnect that is connected to the respective command processor and the respective geometry engine and that delivers and receives data to and from another of the respective command processors and another of the respective geometry engines of another of the plurality of graphics processors,
wherein, via a second interconnect, the respective bus fabric delivers and receives data to and from another of the respective bus fabrics bus fabric of the other of the plurality of graphics processors and is accessibly connected to another of the respective memories connected to the other of the plurality of graphics processors, and wherein each of the first interconnect and the second interconnect is an inter-chip interconnect that samples signals transferred via a signal line of a first of the plurality of graphics processors, and sends a data frame including information obtained by the sampling to a second of the plurality of graphics processors.

7. The information processing system according to claim 6, wherein, with respect to each of the plurality of graphics processors, the first interconnect and the second interconnect that deliver and receive data to and from any other of the plurality of graphics processors are configured to be used or not to be used with respect to each of the any of the other of the plurality of graphics processors, and data is delivered and received to and from the any of the other of the plurality of graphics processors connected via the first interconnect and the second interconnect configured to be used.

8. The information processing system according to claim 6, wherein each of the first interconnect and the second interconnect outputs a signal restored by performing desampling of a data frame received from the second of the plurality of graphics processors onto a signal line of a corresponding intra-chip interconnect in the first of the plurality of graphics processors.

* * * * *